United States Patent
Pavlovic

(10) Patent No.: US 12,084,271 B2
(45) Date of Patent: Sep. 10, 2024

(54) GARBAGE DISPOSAL APPARATUS

(71) Applicant: Andreja Pavlovic, Belgrade (RS)

(72) Inventor: Andreja Pavlovic, Belgrade (RS)

(73) Assignee: Andreja Pavlovic, Belgrade (RS)

( * ) Notice: Subject to any disclaimer, the term of this patent is extended or adjusted under 35 U.S.C. 154(b) by 349 days.

(21) Appl. No.: 17/620,100

(22) PCT Filed: Jun. 19, 2019

(86) PCT No.: PCT/RS2019/000020
§ 371 (c)(1),
(2) Date: Dec. 16, 2021

(87) PCT Pub. No.: WO2020/256576
PCT Pub. Date: Dec. 24, 2020

(65) Prior Publication Data
US 2022/0242662 A1    Aug. 4, 2022

(51) Int. Cl.
*B65F 1/14* (2006.01)
*B65F 1/06* (2006.01)
*B65G 57/03* (2006.01)
*B66F 7/06* (2006.01)

(52) U.S. Cl.
CPC .............. *B65F 1/1426* (2013.01); *B65F 1/06* (2013.01); *B65F 1/1405* (2013.01); *B65G 57/035* (2013.01); *B65F 2210/1443* (2013.01); *B65F 2210/167* (2013.01); *B65F 2210/168* (2013.01); *B66F 7/065* (2013.01)

(58) Field of Classification Search
CPC ..................................... B66F 1/10; B65F 1/10
See application file for complete search history.

(56) References Cited

U.S. PATENT DOCUMENTS 5,148,975 A * 9/1992 Dickerson ................ B65F 1/10
D34/1
5,667,136 A * 9/1997 Chen ..................... B65F 1/1426
220/909
7,175,070 B1   2/2007 Brisport et al.
(Continued)

FOREIGN PATENT DOCUMENTS

RU           175025 U1    11/2017
WO       WO9900316 A1     1/1999

*Primary Examiner* — Mark C Hageman
(74) *Attorney, Agent, or Firm* — The Watson IP Group, PLC; Jovan N. Jovanovic

(57) ABSTRACT

Garbage disposal apparatus (100) for receiving trays comprises a tray receiving means (200), a tray manipulating means (300), a receptacle for garbage disposal (400) and a tray storing means (500), assembled in a way that when garbage disposal apparatus (100) is in operation, the tray receiving means (200) receives a tray (110) which is transported to the tray manipulating means (300) which removes garbage from the tray (110) in the receptacle for garbage disposal (400) and afterwards the tray (110) is stored in the tray storing means (500). Here is disclosed a garbage disposal system (800) which comprises at least one garbage disposal apparatus (100) as described, at least one horizontal tunnel (810), at least one vertical tunnel (820) and at least one tray collecting means (830), arranged so that tray collecting means (830) travels within the horizontal tunnel (810) and is collecting trays (110) from the garbage disposal apparatus (100).

14 Claims, 19 Drawing Sheets

(56) References Cited

U.S. PATENT DOCUMENTS

| | | | |
|---|---|---|---|
| 8,157,159 B2 * | 4/2012 | Al-Hadhoud | B65F 1/1607 220/264 |
| 2006/0102639 A1 * | 5/2006 | Lubbe | B65F 1/10 220/825 |
| 2011/0280694 A1 | 11/2011 | Al-Hadhoud et al. | |

* cited by examiner

GARBAGE DISPOSAL APPARATUS

FIELD OF THE INVENTION

The present invention belongs to the field of garbage disposal apparatus of the type widely used in fast-food restaurants, shopping malls, canteens and the like, into which the waste contents of a food tray are emptied through an automatic system and trays are stored for the next use. Also, this invention relates to the system engaging several garbage disposal apparatus installed in a particular facility or in a multi-storey building.

TECHNICAL PROBLEM

Fast-food restaurants are very popular places to eat. Food and beverages are served in plastic/paper packaging and after the meal and/or drink is consumed the packaging and/or food/beverage containers should be disposed. Usually food and beverage are delivered directly at the counter on a tray. Consumer after eating should dispose the tray together with garbage (food rests/packaging). The disposal is done manually in trash cans and in racks or shelves where trays are disposed. In some applications consumer separates garbage from the tray, in some other applications they just left the tray with garbage on it, so an operator later on separates garbage from the tray. There is a need to monitor each particular trash can or rack or shelve if it is full, and when full to empty it manually, otherwise it is not possible any further to dispose any garbage or tray.

Very similar situation is in canteens and places the like.

An object of the present invention is to solve the problems described above by providing the garbage disposal apparatus which is automated, which is safe to use, which is reliable to operate and do high quality work when it is needed to dispose the tray with garbage in a way that garbage is separated from tray so that garbage is disposed in appropriate receptacle and the trays are stored for further use.

Also, an important aspect of this invention is the reduction of manpower in garbage disposal and tray collecting process.

Further problem solved by inventor is to integrate several garbage disposal apparatus in multi-storey building, so the efficiency of garbage disposal and tray manipulation is increased.

DESCRIPTION OF THE PRIOR ART

Nowadays in fast food restaurants it is widely used manual system in which user, after consuming food, takes the tray with the garbage on it (food rests, packaging and/or plastic cutlery) and brings it to the rack where tray together with the garbage is disposed. When mentioned rack is full with trays it is transported to the appropriate place where operator manually dispose garbage from the tray to the garbage bin or similar.

Another applications uses trash cans, eventually where user separates the garbage from the tray and disposes it in different trash can ie. for plastic, for paper or for organic waste etc. All this applications engage manual work, do require permanent visual monitoring and involve considerable amount of extra work to remove the garbage and to manipulate with trays.

The inventor has not found in the prior art the device which automatically separates garbage from the tray and stores trays in appropriate place in a way as disclosed here.

BRIEF SUMMARY OF THE PRESENT INVENTION

The garbage disposal apparatus for receiving trays disclosed in this invention overcomes all the disadvantages of the prior art. The key components comprised in the garbage disposal apparatus are a tray receiving means, a tray manipulating means, a receptacle for garbage disposal and a tray storing means. This components are assembled in a way that when garbage disposal apparatus is in operation, the tray receiving means receives a tray with garbage on it, which tray is transported to the tray manipulating means which removes garbage from the tray in the receptacle for garbage disposal and afterwards the said tray is stored in the tray storing means. The tray receiving means comprises infrared sensors for hand detection and infrared sensors for tray detection, a platform for receiving the tray, a tray adjustment means and a tray transportation means. When the garbage disposal apparatus is in operation, at least two infrared sensors indicates that there is no hand in the vicinity of the tray receiving means when platform for receiving the tray is not in the position to receive the tray, and when the tray is put on the platform for receiving the tray it is detected with two infrared sensors with lens, then the tray is automatically adjusted in position by the tray adjustment means so the tray could be transported by the tray transportation means toward the tray manipulation means. The tray adjustment means comprises a tray directing means and a tray detecting means with the function of the tray detecting means to detect if the tray, when the garbage disposal apparatus is in operations, is in the right position and if not, then the tray directing means directs automatically the tray in the right position toward the tray manipulating means. Said tray directing means is realized with two sheets fixed on each sides of machine construction in the level of the platform for receiving the tray, narrowing the path for platform movement in the direction of the tray manipulating means. The tray detecting means are realized with infrared sensors and microswitches.

The tray manipulating means comprises a jaw, a position detecting means, a shaking means and a jaw horizontal transportation means, the jaw being suitable to grip the part of the tray. When the garbage disposal apparatus is in operation, the jaw horizontal transportation means moves the tray between the first position and second position, or holds one of these positions. Open jaw receives the tray from the tray receiving means when the jaw horizontal transportation means is in the first position, and the jaw closes when the position detecting means detects that the part of the tray is in the jaw, said tray being in horizontal position. The jaw then closes and the tray stays gripped in the jaw and together with the jaw it is lifted approx. 10 mm upward, so it makes enough space that the platform could move in the rare part of the machine making space for tray rotation. After the platform reaches the rare part of the machine, the tray is rotated together with jaw down in inclined position, usually for an angle more than 70° and less than 85°, so the garbage from the tray fails into the receptacle for garbage disposal which is placed under the jaw. When the tray has reached said position, the shaking means shakes the tray so eventually particles which still stick to the tray are released from the tray surface. After the tray is shaken, the jaw together with the tray rotates back, so the tray reaches its original horizontal position being gripped in the jaw. When the tray holds this position, the platform moves back in its first position, opening the space for the jaw horizontal transportation means to transport the tray gripped in jaw to the tray storing means. When in its final position in the tray storing means, the jaw together with the tray is slightly rotated downward in the position in which jaw opens and delivers the tray to the support for collecting trays.

The tray storing means comprises a support for collecting trays, a lifting device and a means for detecting the tray's quantity. When the garbage disposal apparatus in operations, the tray is from the tray manipulating means placed to the support for collecting trays, said support being lowered down by the lifting device to the position determined by the means for detecting the tray's quantity, so the new tray could come on the top of said tray which is already on the support for collecting trays, trays being stored on the support for collecting trays placed one on the top of another, up to the level the means for detecting the tray's quantity detects that the maximum number of trays on the support for collecting trays is achieved.

In one more advanced application the garbage disposal apparatus further comprises a garbage level detection means, a compressing means and a receptacle removal means. The garbage level detection means detects the garbage level in the receptacle for garbage disposal and if said garbage level corresponds to the predetermined value, the compressing means compresses the said garbage, and once detected that the receptacle for garbage disposal is full, the said receptacle is removed from the garbage disposal apparatus by the receptacle removal means or by hand. As the receptacle for garbage disposal usually is used a sack. If plastic sack is used, then in one more advanced embodiment it could be used plastic welding device installed in garbage disposal apparatus with function to weld sack ends once the sack is full with the garbage. This assures that garbage is not spilled around when disposed from the garbage disposal apparatus.

Also, the compressing means might further comprise a plate having upper and lower side, said plate being placed horizontally, two sets of scissor type levers each said set having fulcrum and two levers, the first lever and the second lever, attached in fulcrum in the middle of each lever so the first lever can rotate relative to the second lever, wherein each lever has the first and the second end, the said first end being close to the plate, two lower sliders, each attached to the first end of the first lever, two linear guides with closed ends parallelly mounted on the upper side of the plate, two linear guides with closed ends parallelly mounted on the tray receiving means, two upper sliders, each attached to the second end of the second lever and an engagement means. One lower slider is installed on each linear guide mounted on the upper side of the plate, so said slider can slide over said linear guide together with the lever's end between said linear guide's ends and wherein one upper slider is installed on each linear guide mounted on the tray receiving means, so said slider can slide over said linear guide together with the lever's end between said linear guide's ends, wherein the upper sliders are moved by the engagement means, wherein when the engagement means activated, the upper sliders moves parallel in direction determined by the rotation of the spindle driven by spindle electromotor, so the plate might move vertically up or down. If needed to press the garbage in the receptacle for garbage disposal then plate moves down, and if needed to transfer the plate in its original position, then the plate moves up.

The garbage disposal apparatus might further comprise the front compartment and the rear compartment arranged so that the receptacle for garbage disposal is located in the front compartment and the tray storing means is located in the rear compartment.

The part of this invention is a garbage disposal system which comprises at least one garbage disposal apparatus as described above, at least one tray collecting means and at least one horizontal tunnel. Also, the garbage disposal system in another embodiment comprises at least one garbage disposal apparatus as described above, and at least one vertical tunnel. In further embodiment the garbage disposal system comprises at least one garbage disposal apparatus as described above, and at least one vertical tunnel and at least one horizontal tunnel. If there is a combination of at least one horizontal tunnel and at least one vertical tunnel, then it is possible that at least one vertical tunnel intersects perpendicular at least one horizontal tunnel and each garbage disposal apparatus in this system, when in operation and when the maximum level of garbage in particular apparatus is reached or when the maximum number of trays in tray storing means is reached, this particular garbage disposal apparatus is placed over the opening of the vertical tunnel so the front compartment is above the vertical tunnel and the rear compartment is above the horizontal tunnel.

Usually, the receptacle for garbage disposal is a sack.

In such a system with at least one horizontal tunnel, at least one tray collecting means travels horizontally within the horizontal tunnel between at least one garbage disposal apparatus and the place for emptying said tray collecting means.

If sack is full with garbage, said sack is at first closed in the garbage disposal apparatus and then it is eliminated from apparatus through the vertical tunnel. It is important to close the sack to avoid garbage to spill all over the tunnel or to distribute unpleasant odour in the tunnel.

Usually it is used sack welding technology, ie. when garbage is disposed in polyethylene sack, then welding technology for polyethylene is used. Once when tray storing means is full with trays, said trays are picked up by the tray collecting means and are transported by tray collecting means to the spot for emptying.

Usually, the tray collecting means is an electromotor operated scissor lift platform including wheels, so it can linearly move on guides in horizontal tunnel. Also, the part of such a system might be a container placed under the vertical tunnel, so each sack full with the garbage by movement of a platform shaped door installed on the bottom of the garbage disposal apparatus is disposed, so it fails through the vertical tunnel into said container.

BRIEF DESCRIPTION OF DRAWINGS

The enclosed images, which are referred to in the description and which form a part of the description, illustrate the best invention embodiment and help explain the basic principles of the invention. This invention is not in any way limited by the drawings included in the present invention.

A LIST OF REFERENCE SIGNS USED IN THE DRAWINGS

Figure 1:
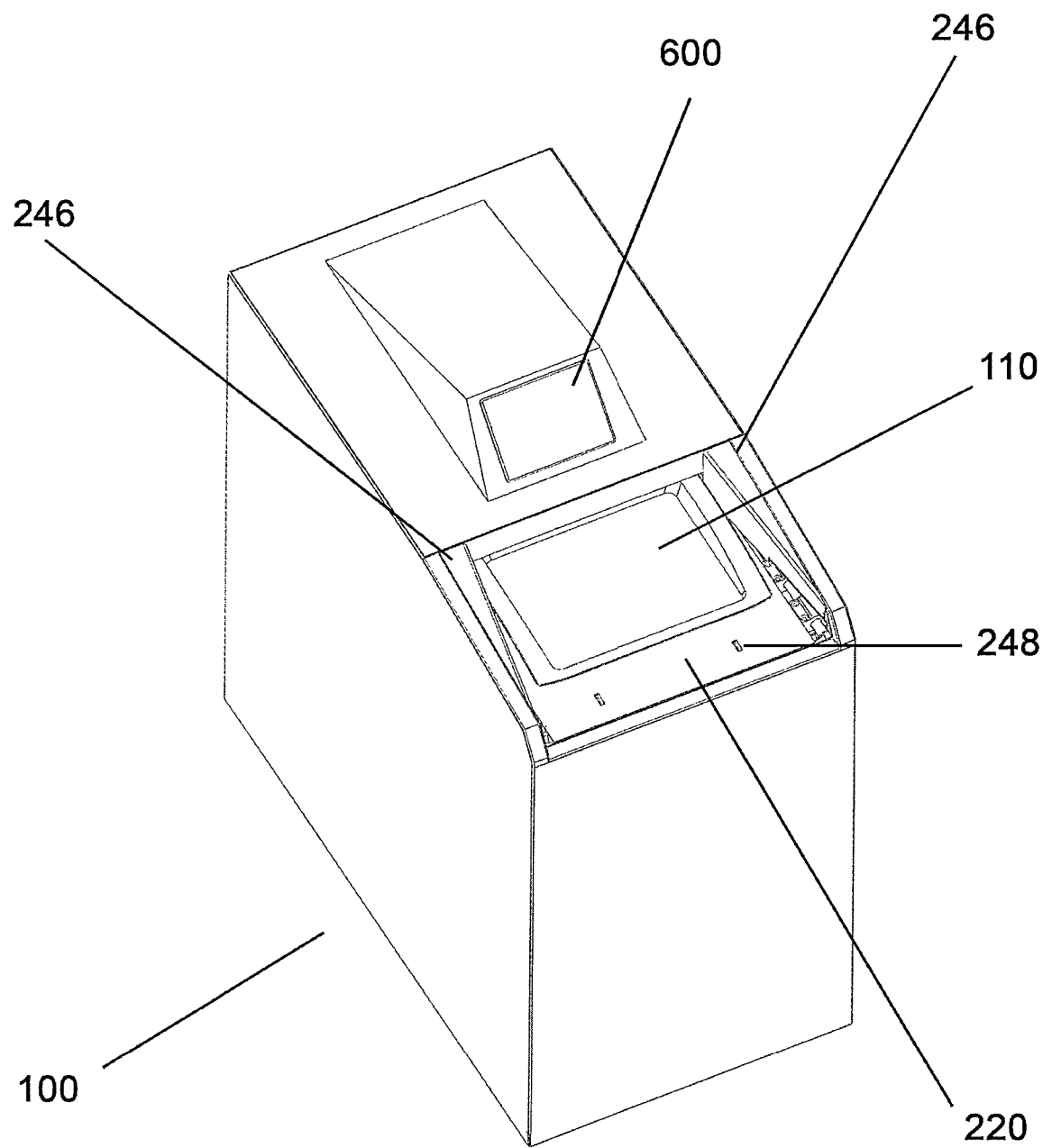
FIG. 1. The garbage disposal apparatus with the tray placed on tray receiving means FIG. 2. The garbage disposal apparatus FIG. 3. The garbage disposal apparatus without enclosure with the tray in tray manipulating means FIGS. 4.*a*., 4.*b*. The garbage disposal apparatus from inside, with trays collected on support for collecting trays and scissor type levers in open position (the plate is pressed down)
Figure 2:
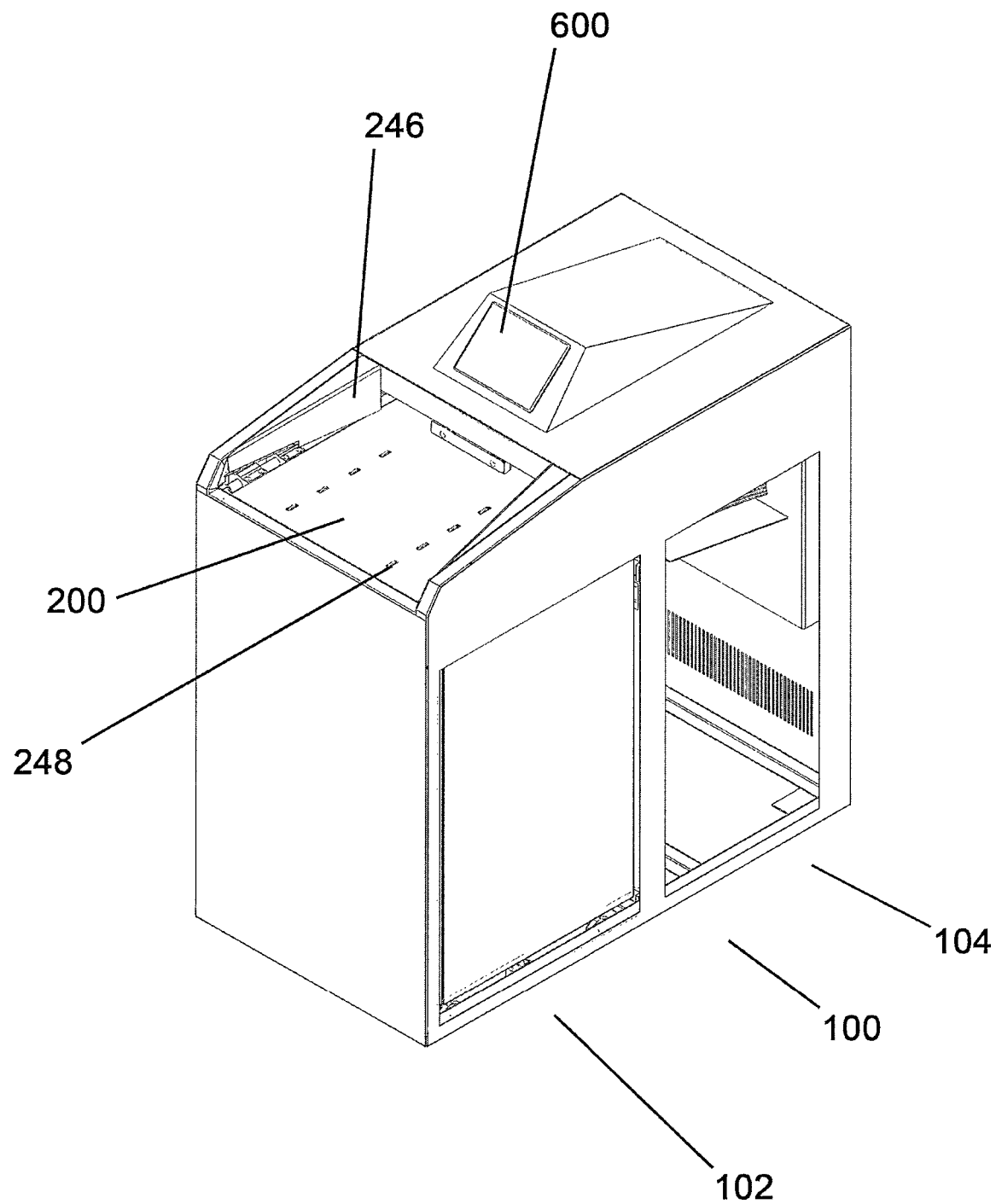
Figure 3:
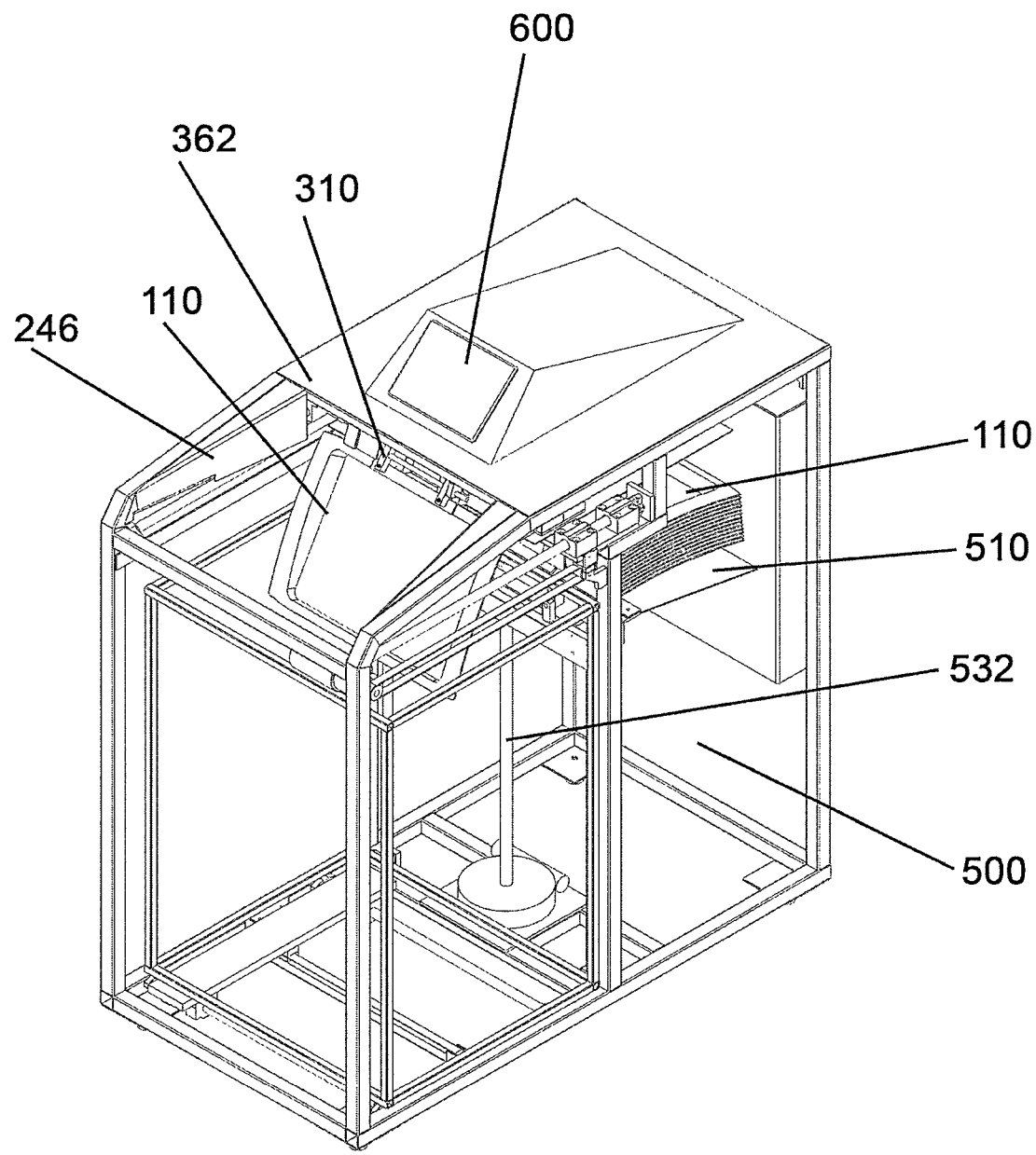
Figure 4A:
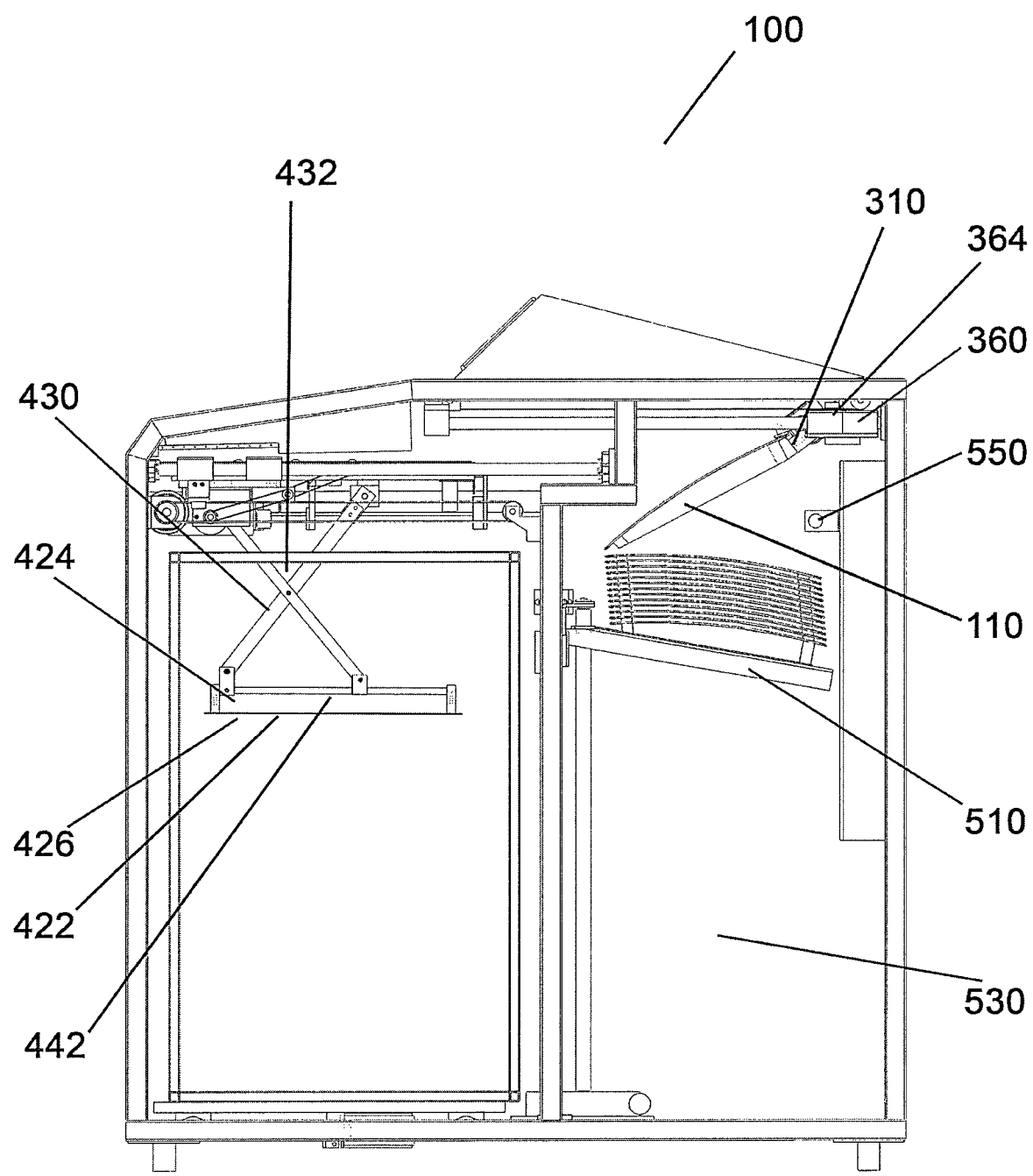
Figure 4B:
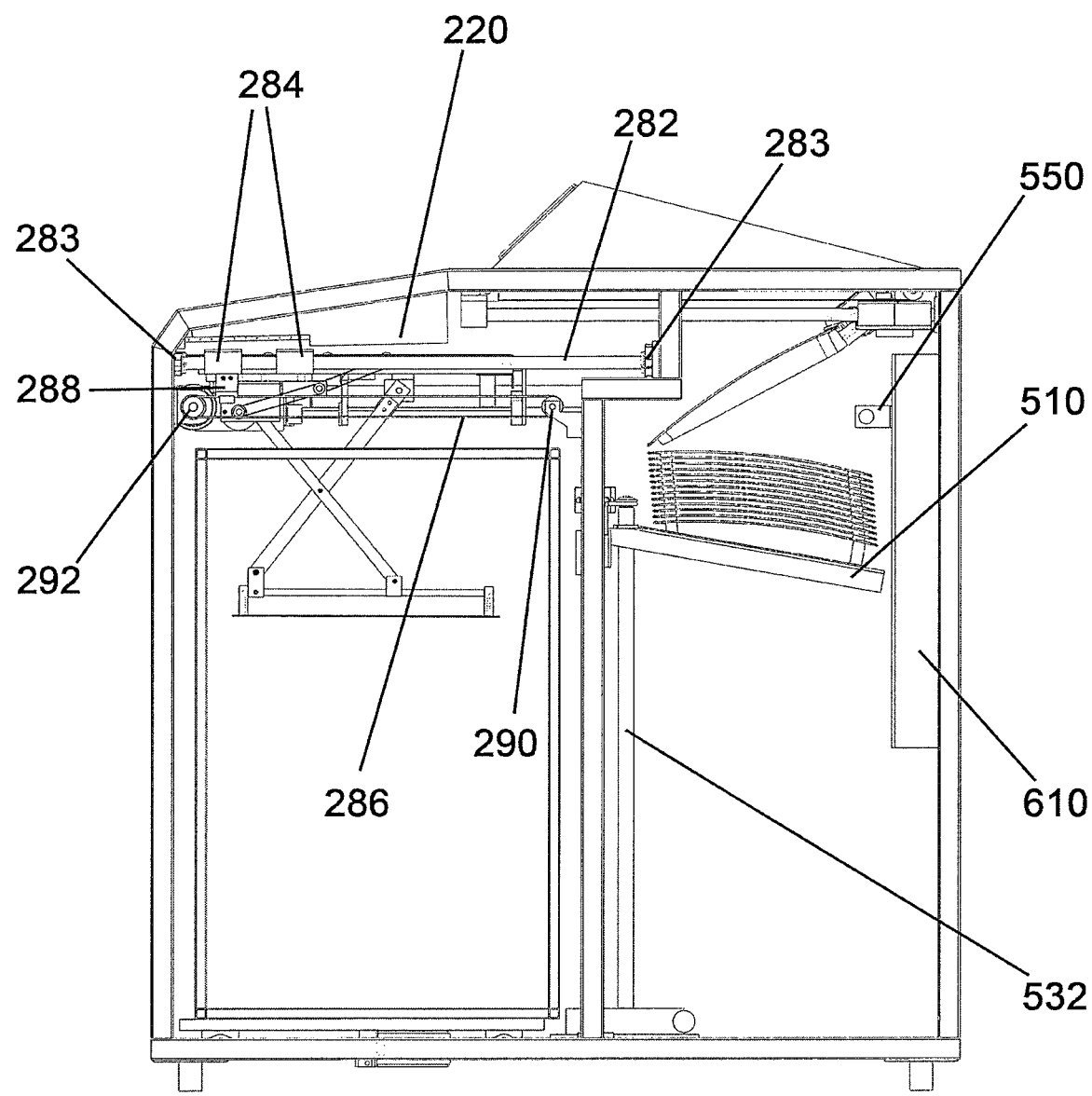
Figure 5:
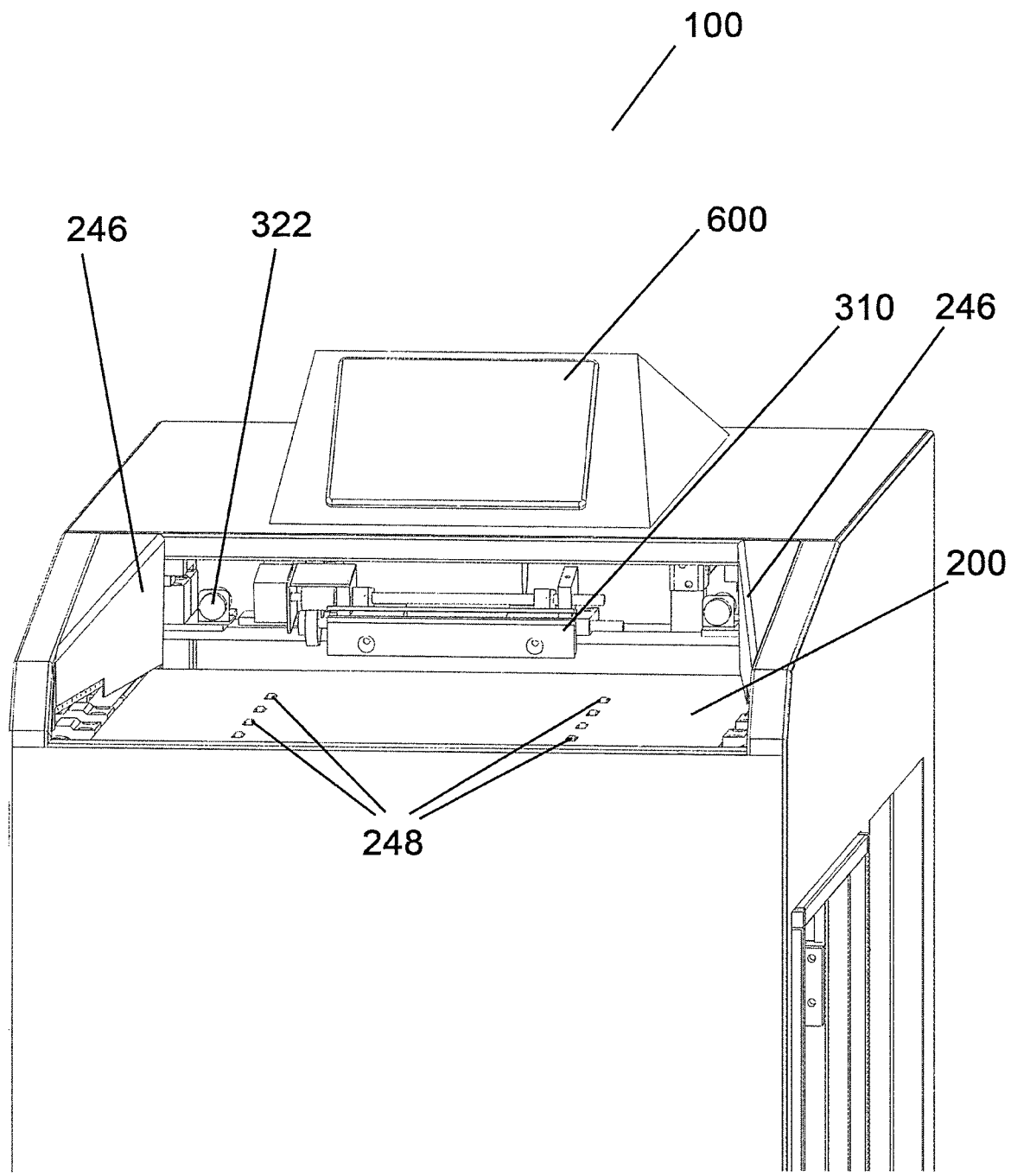
FIG. 5. The front view of tray manipulating means
Figure 6:
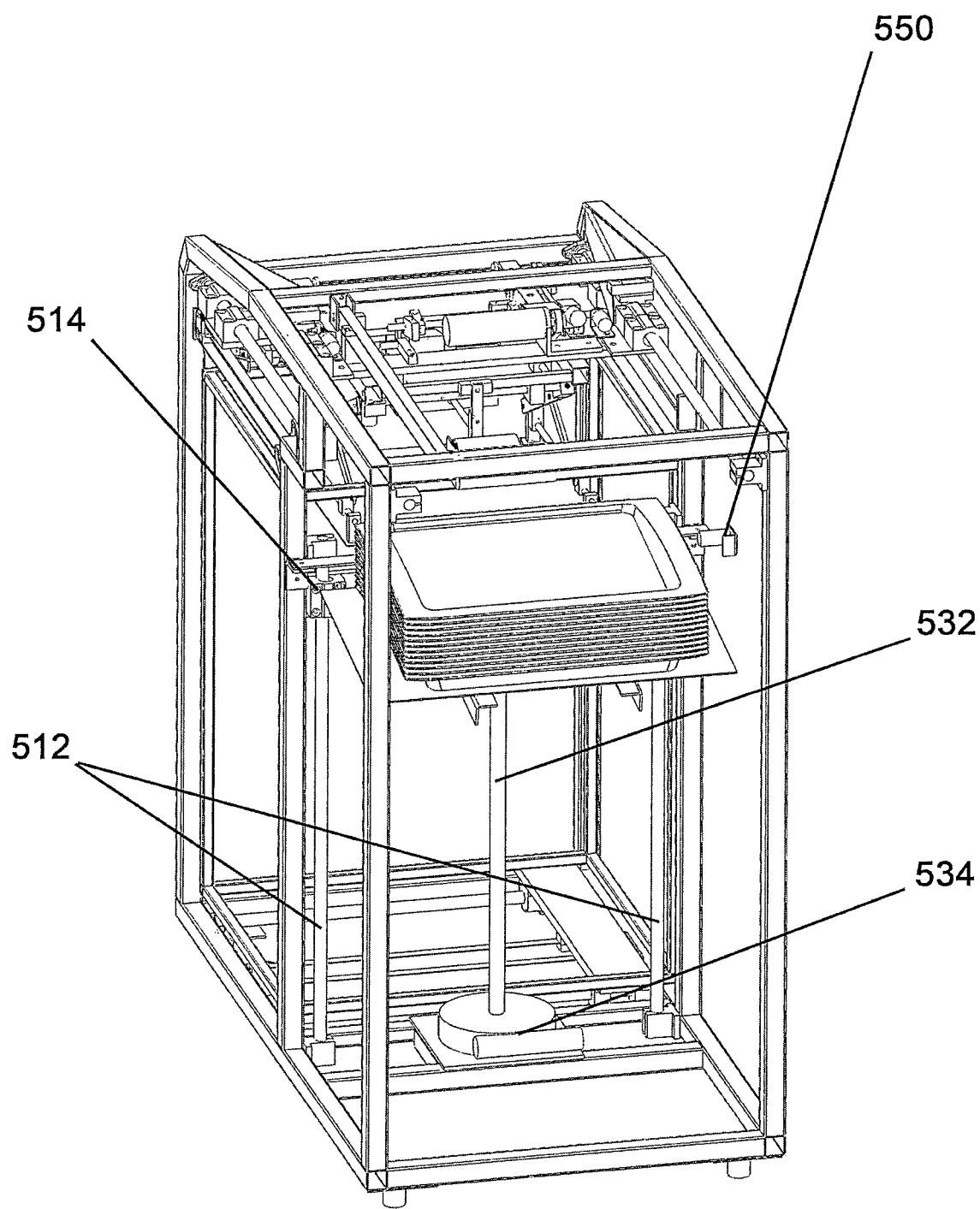
FIG. 6. The rear view of tray storing means
Figure 7:
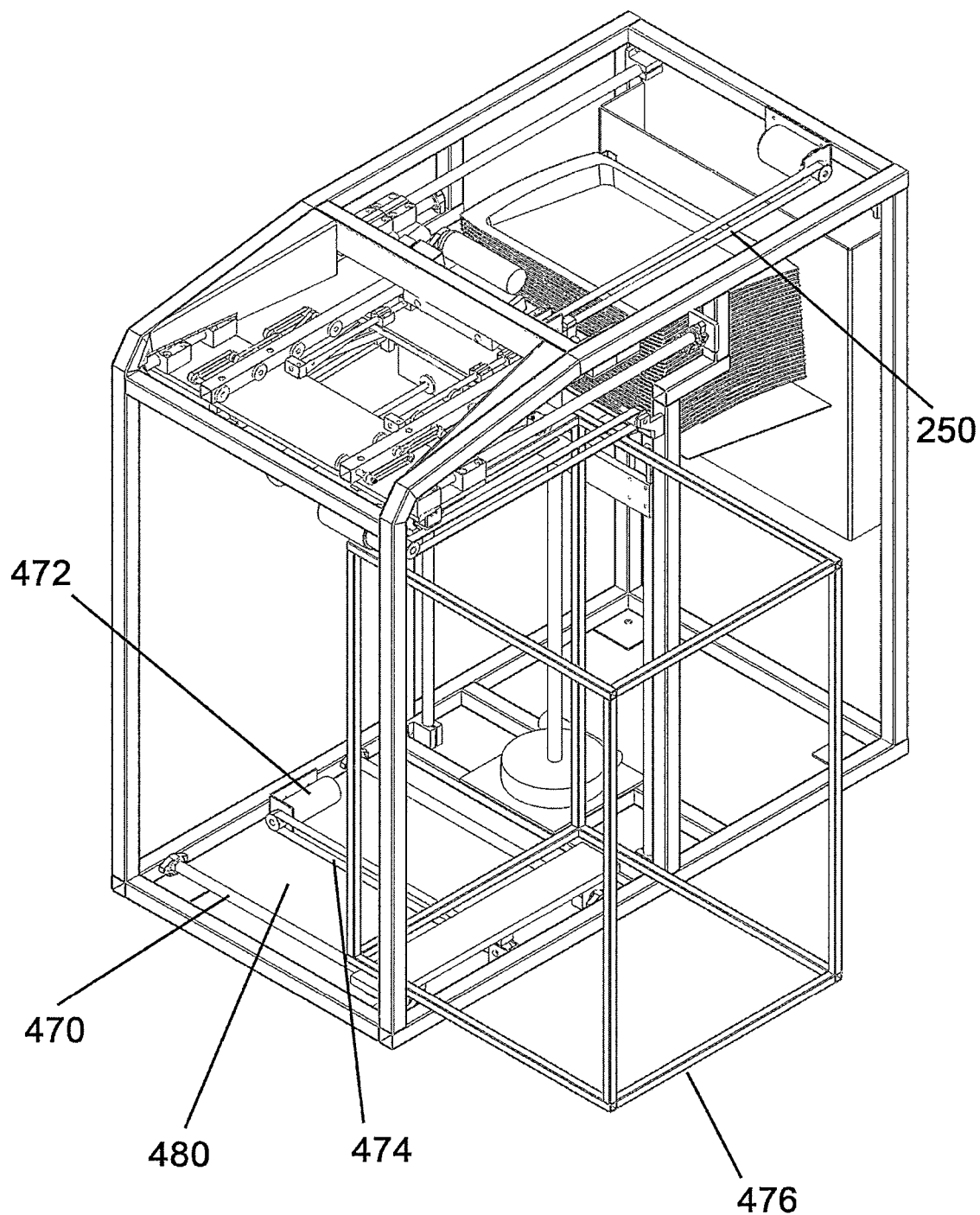
FIG. 7. Detailed view of the receptacle removal means
Figure 8:
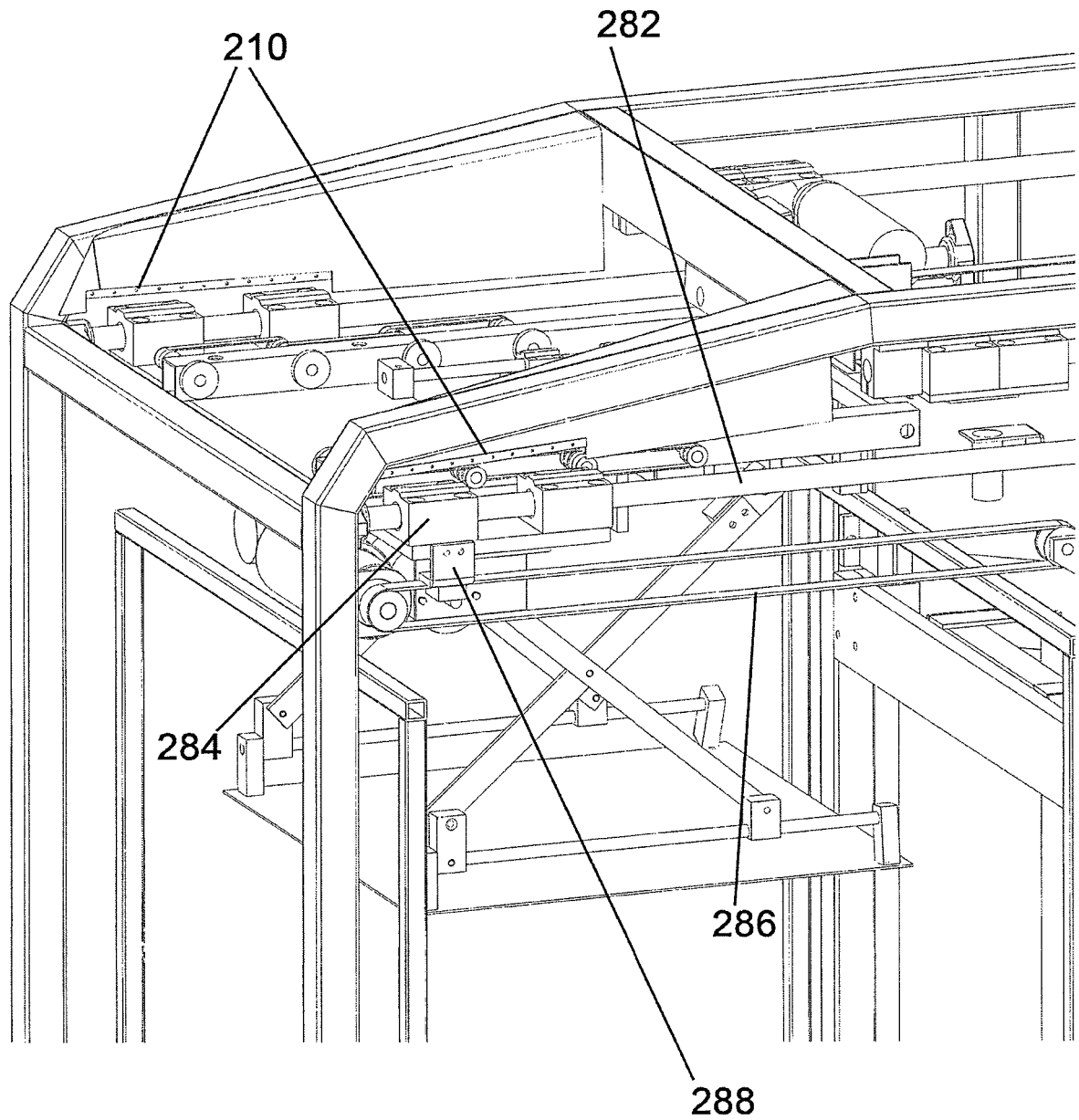
FIG. 8. Detailed view of platform guide with bearing, drive belt and hand sensors FIG. 9. Detailed view of the garbage level detection means and garbage press FIG. 10. Detailed view of one embodiment of the tray transportation means FIG. 11. Detailed view of tray manipulating means FIG. 12. Detailed view of compressing means (garbage press)—top side view FIG. 13. Detailed view of compressing means (garbage press)—view from the underside FIG. 14. The position of microswitches within the garbage disposal apparatus FIG. 15. The section view of the garbage disposal system FIG. 16. The detailed view of tray collecting means collecting trays under the garbage disposal apparatus FIG. 17. The detailed view of sack sealer device FIG. 18. The detailed view of the mechanism for disposing bags into vertical channel
Figure 9:
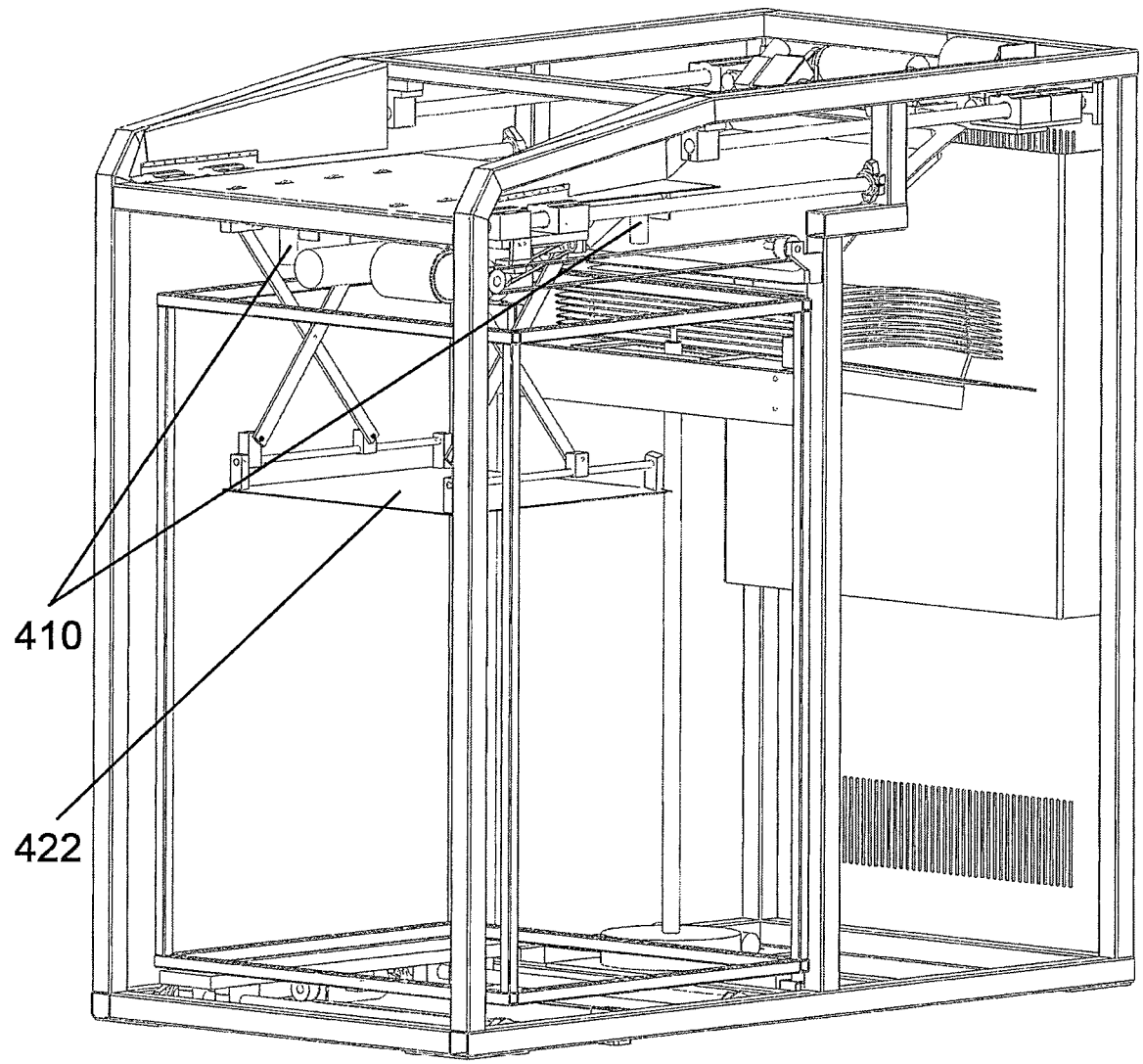
Figure 10:
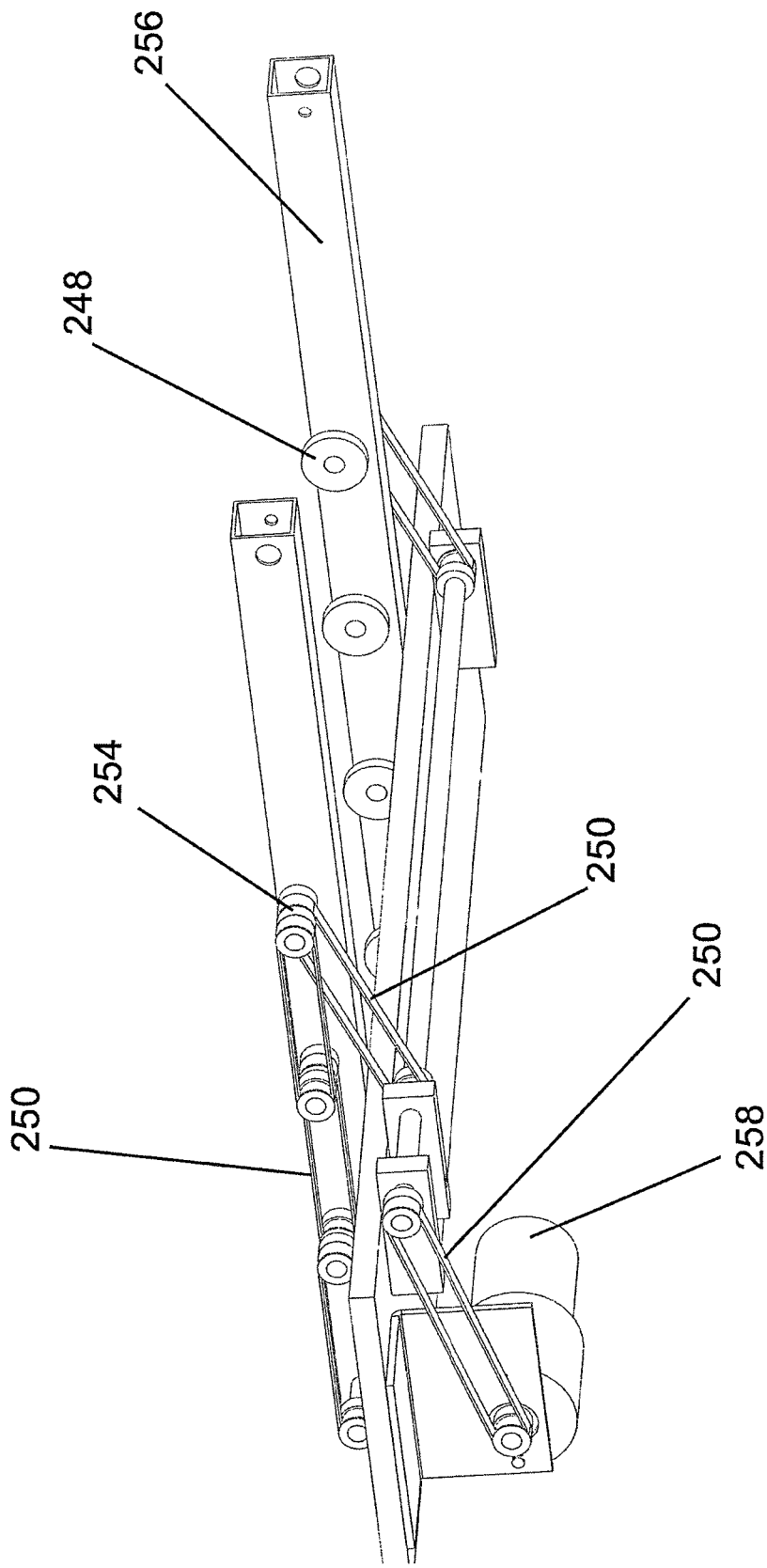
Figure 11:
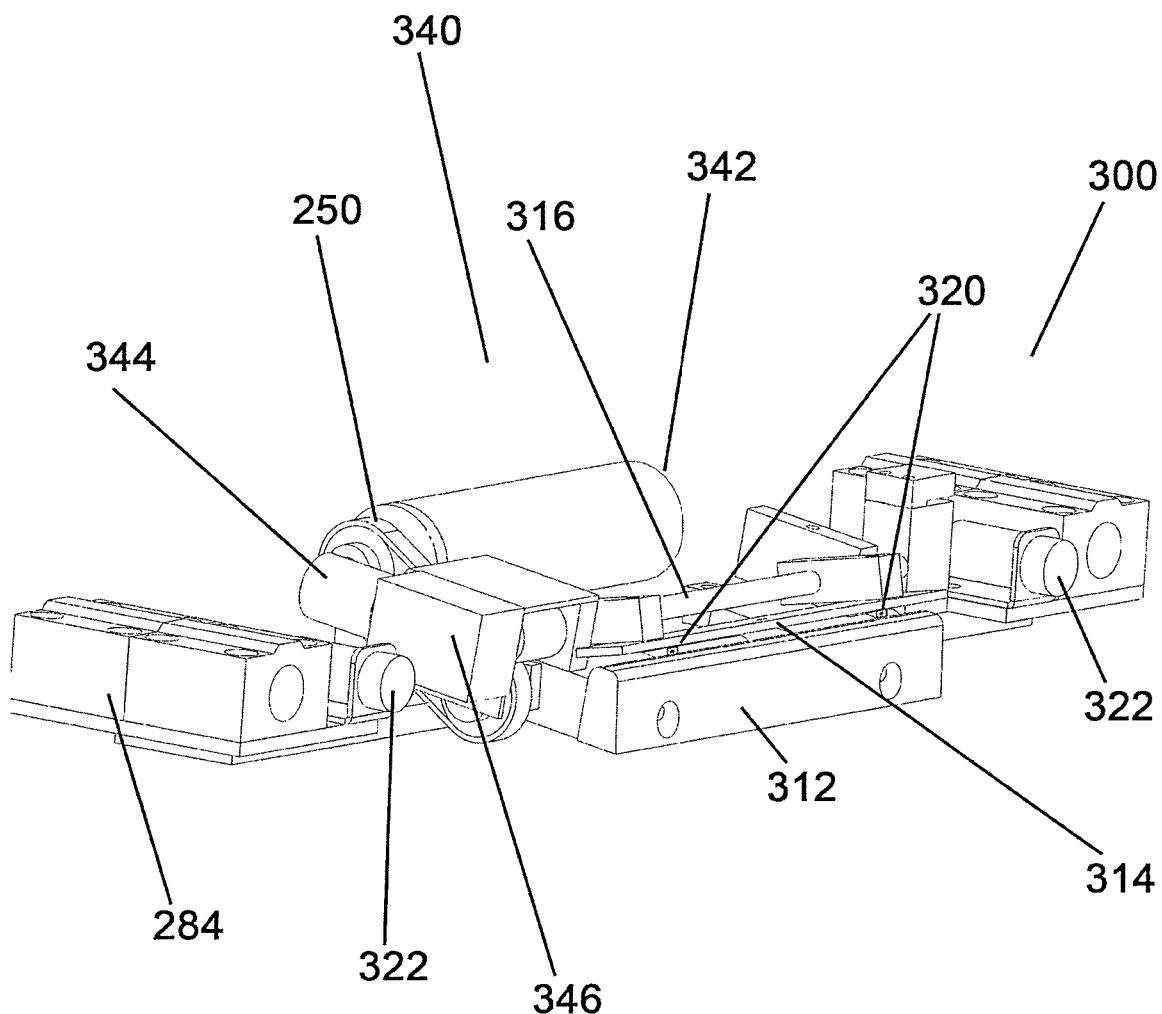
Figure 12:
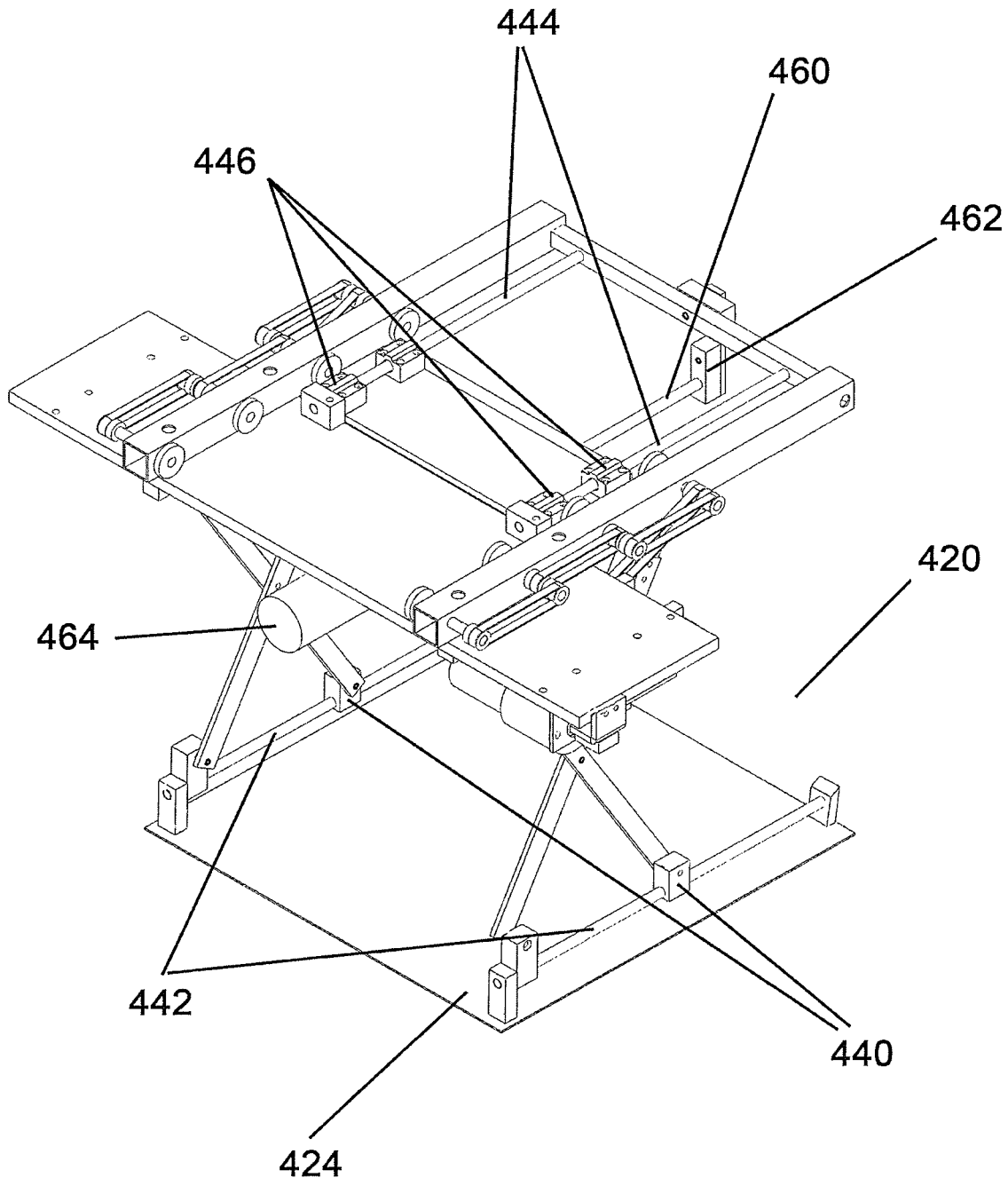
Figure 13:
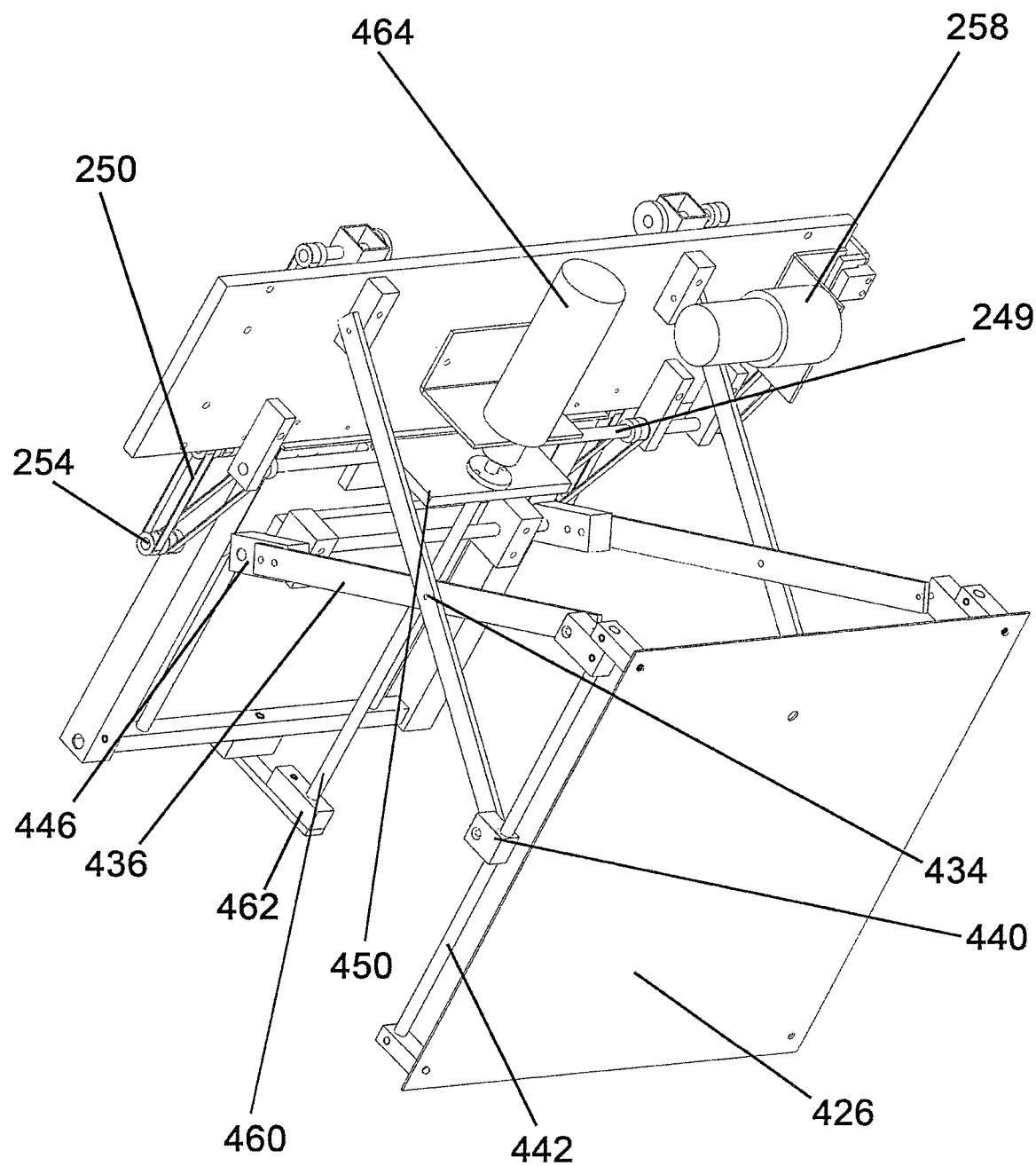
Figure 14:
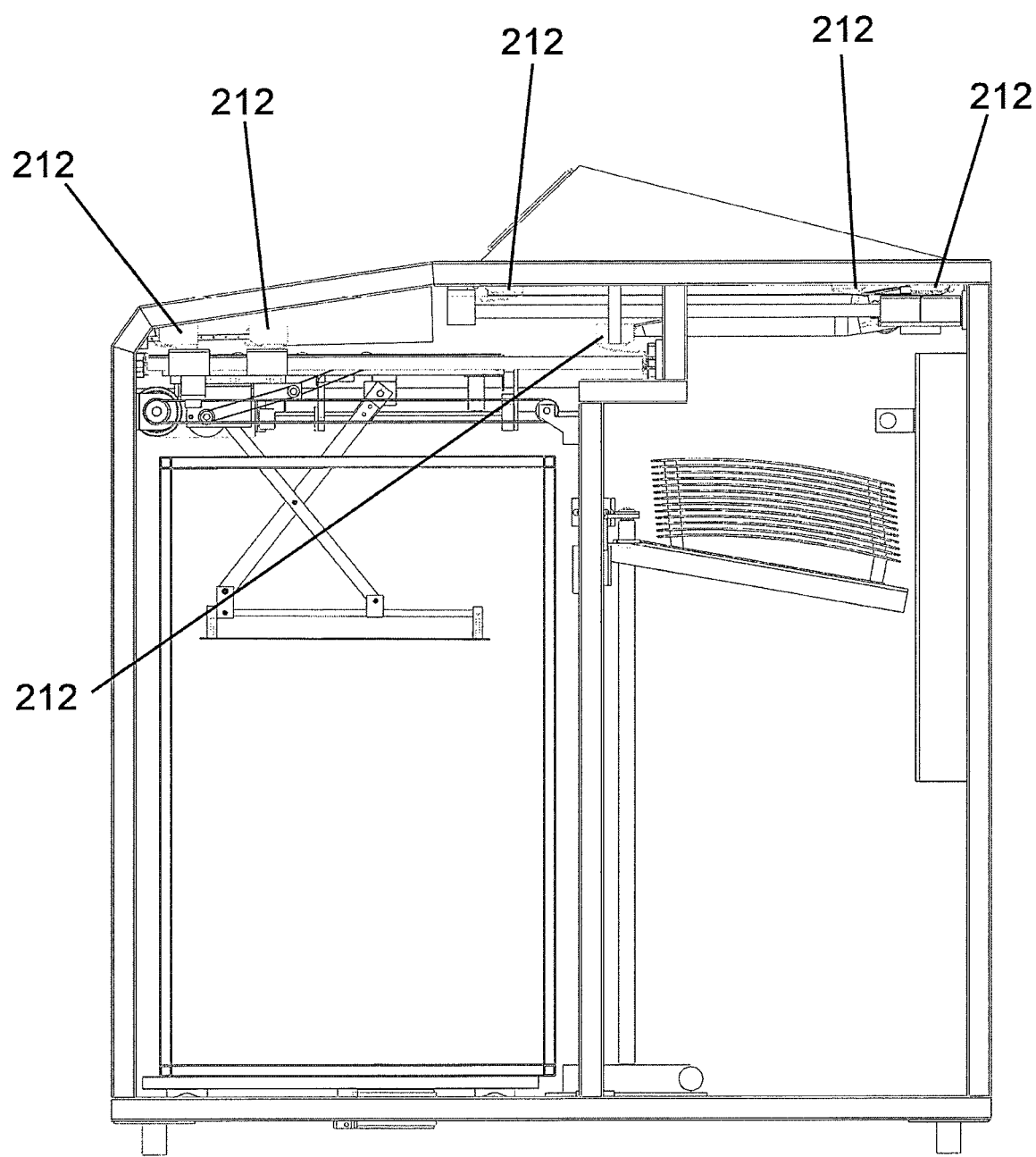
Figure 15:
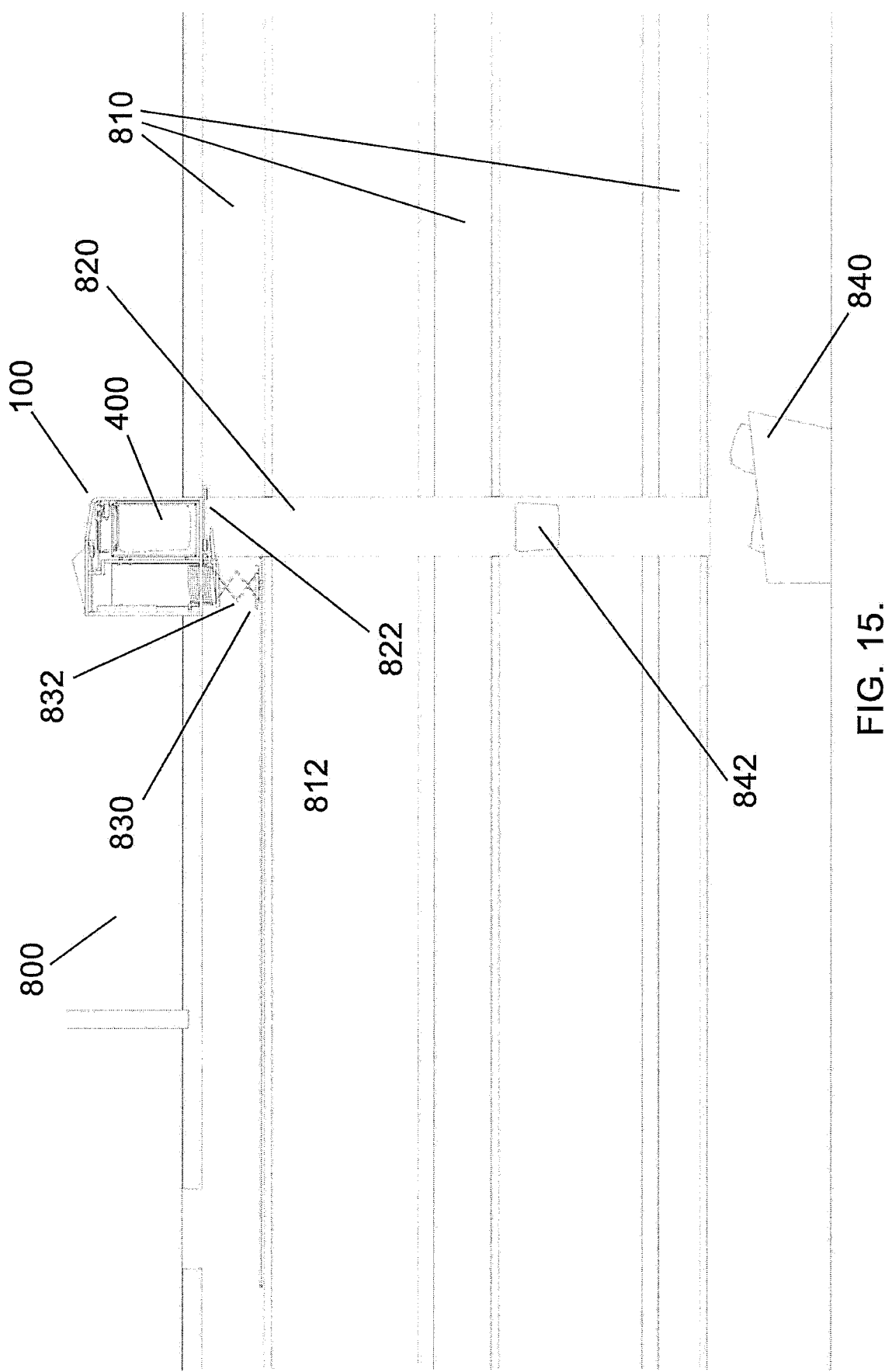
Figure 16:
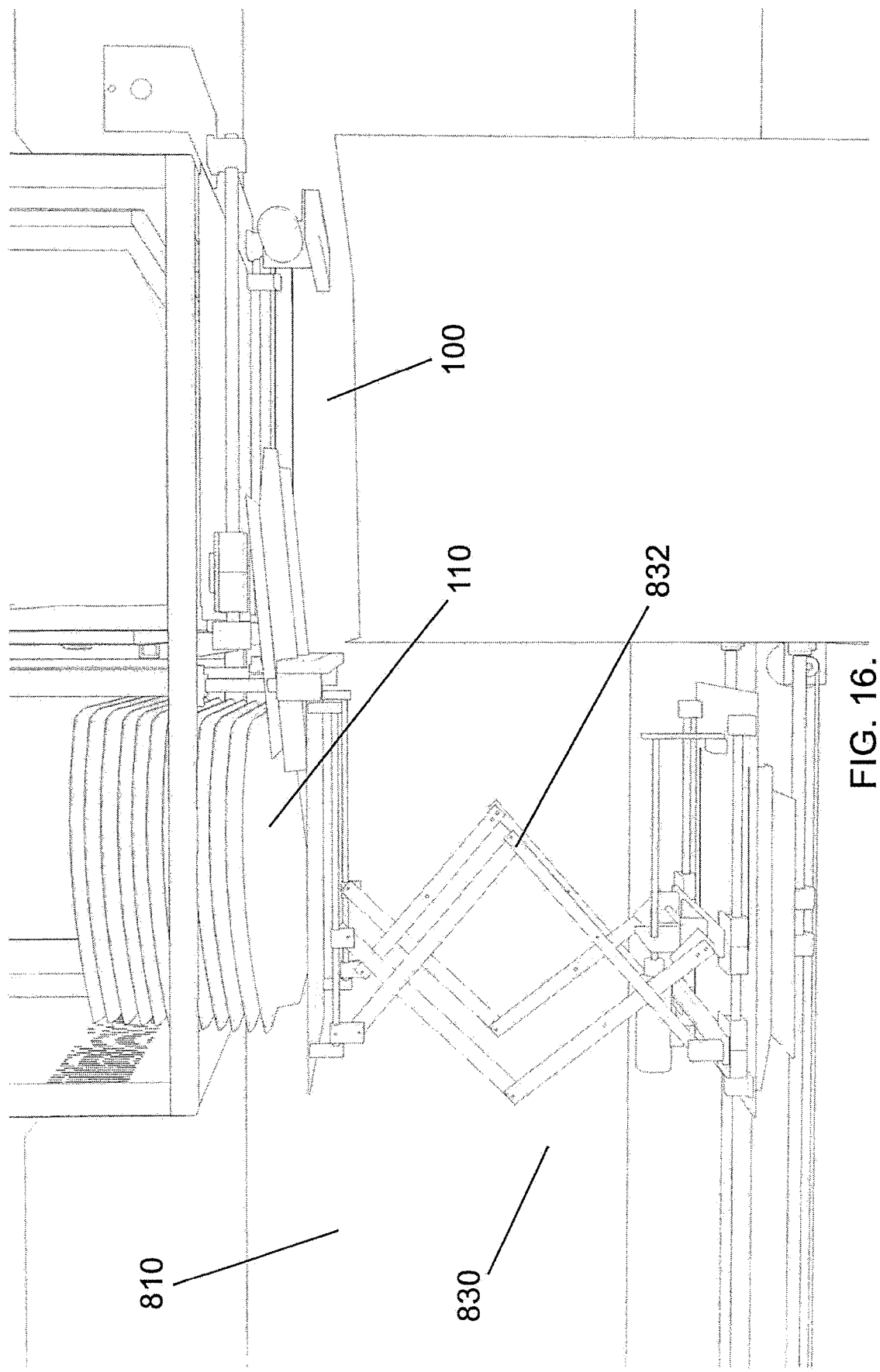

100—garbage disposal apparatus
102—the front compartment
104—the rear compartment (a tray storing compartment)
110—tray
200—tray receiving means;
210—infrared sensor for hand detection
212—switch
220—platform for receiving the tray;
246—tray directing means,
248—wheel for tray transportation
249—tray transportation wheel shaft
250—drive belt
254—pulley
256—wheels support
258—electromotor for tray transportation wheels
282—platform guide
283—platform guide support
284—platform bearing
286—platform drive belt
288—platform drive belt and platform bearing engagement means
290—platform pulley
292—platform electromotor pulley
300—tray manipulating means;
310—jaw;
312—lower jaw
314—upper jaw
316—jaw shaft
320—position detecting means
322—tray detecting means
340—shaking means
342—electromotor for jaw rotation
344—electromotor for jaw closing/opening
346—bevel gear
360—jaw horizontal transportation means,
362—the first position of the jaw horizontal transportation means
364—the second position of the jaw horizontal transportation means
400—receptacle for garbage disposal
410—garbage level detection means
420—compressing means (garbage press)
422—plate
424—plate upper side
426—plate lower side
430—set of scissor type levers
432—fulcrum
434—the first lever
436—the second lever
440—lower slider
442—linear guide with closed ends mounted on the upper side of the plate
444—linear guides with closed ends mounted on the tray receiving means
446—upper slider
450—engagement means
460—spindle
462—spindle support
464—spindle electromotor
470—receptacle linear side guide
472—electromotor for receptacle removal
474—receptacle drive belt
476—cage
480—receptacle removal means
500—tray storing means
510—support for collecting trays
512—lifting device linear guide
514—lifting device bearing
530—lifting device
532—lifting device spindle
534—lifting device motor with snail gear
550—means for detecting the tray's quantity
600—display
610—control unit with power supply
800—garbage disposal system
810—horizontal tunnel
812—the opening of the horizontal tunnel
820—vertical tunnel
822—the opening of the vertical tunnel
830—tray's collecting means
832—scissor lift platform
840—container
842—sack
850—lower motor
852—lower motor support
854—lower belt
856—lower axial support
858—lower linear bearing
860—platform shaped door
862—lower linear guide
864—lower belt and lower linear guide engagement means
866—lower axial support base
868—hot bar sealer
870—sealer motor
874—sealer engagement means
876—sealer linear bearing
878—sealer belt
880—sealer linear guide

DESCRIPTION OF THE PREFERRED EMBODIMENTS

The disclosed garbage disposal apparatus comprises basically two synchronized units: the front compartment 102 in which receiving, gripping and emptying of the trays takes part and the rear compartment 104 in which transport and storing of trays happen. The most suitable trays are perpendicular one with the edge, usually used in the fast food restaurants or canteens. The operation of the garbage disposal apparatus 100 starts once the platform for receiving the tray 220 receives the tray 110. The tray detecting means 322, which are usually infrared sensors, detects that the tray 110 is on the platform for receiving the tray 220 and afterward eight wheels for tray transportation 248 are activated which direct the tray 110 toward the tray manipulating means 300. Said wheels are run by tray transportation wheel shaft 249 and are the part of tray receiving means 200. Eventually, if the tray 110 is not laying straightforward, it is necessary to adjust the position of the tray 110 so it horizontally reaches the jaw 310 within the tray manipulating means 300 in perpendicular orientation, so jaw 310 grips the tray 110 with lower jaw 312 and upper jaw 314, so the tray 110 stays well gripped in the jaw 310 and can not separate from the jaw 310 during the tray emptying process which follows. The tray adjustment is done with eight wheels for tray transportation 248 or with sheets fixed on the sides of apparatus construction which functions as a tray directing means, which sheets narrows the opening toward the tray manipulating means 300. Wheels for tray transportation 248 are mounted to the wheel support 256 which holds pulley 254 and drive belt 250 used to run wheels 248, with an electromotor for tray transportation wheels as a main source to rotate wheels. If the tray 110 is put on the platform for receiving the tray 220 in a way that it is detected by tray detecting means 322, for what is usually used infrared sensors with lens, that the position is not adjustable either by wheels for tray transportation 248 or by side sheets having function of the tray directing means 246, then such a position is signaled to the display 600 and there is a need for manual adjustment. If the tray 110 is in the right position, and no mechanical obstacles are detected, the wheels for the tray transportation 248 do force the tray 110 to move forward which with its edge inserts in the jaw 310. In the tray manipulating means 300, close to the jaw 310, there is a position detecting means 320, which detects that the tray 110 has entered the jaw 300; in the standard embodiment as the position detecting means 320 two microswitches are used, one on the left side of the jaw 300 and the another on the right side of the jaw. For closing the jaw 300, both microswitches must detect that there is a tray 110. The jaw is closed with the electromotor for jaw closing/opening 344.

Once the tray 110 is gripped by the jaw 310, the automatic cycle begins. After the jaw 310 grips the tray 110, the jaw 310 itself rise the tray 110 approx. 10 mm relative above to the platform for receiving the tray 220. This step is necessary while it is important to physically split the tray 110 from the platform for receiving the tray 220. Said platform 220 comprises platform guide support 283, platform drive belt and platform bearing engagement means 288, platform pulley 290, platform electromotor pulley 292 and platform pulley's electromotor. Once the tray 110 is risen, it is activated the next step to move the platform for receiving the tray 220 to the tray storing compartment 104 what opens the space for tray emptying and shaking, so the garbage from the tray 110 slips in the receptacle for the garbage disposal 400. The platform for receiving the tray 220 moves on platform bearings 284 which moves over two linear platform guides 282 using the motion control systems with deceleration detectors. This linear movement is between the front compartment 102 and the rear compartment 104. After the platform for receiving tray 220 reaches its final position in the rear compartment 104, the jaw 310 is rotated together with the tray 110 gripped in the jaw 310 and is shaken by shaking means 340 around the jaw shaft 316. In one embodiment the shaking means is realized with electromotor for jaw rotation 342 and drive belt 250 controlled by PLC. Shaking means 340 also comprises a bevel gear 346. The best position to empty garbage from the tray 110 is when the tray 110 is rotated for 80°, so under the gravity all the items fails into the receptacle for garbage disposal. With shaking, eventually, items which somehow sticks to the tray 110 ie. wet paper on the surface of the tray 110 are removed from the tray.

After the tray 110 is shaken, the jaw 310 rotates with the tray 110 in its starting position, keeping its position 10 mm above the platform for receiving the tray 220. When said starting position reached, which corresponds to the first position of the jaw horizontal transportation means 362, the platform for receiving the tray 220 moves back from the rear compartment 104 to the front compartment 102. By the jaw horizontal transportation means 360 the jaw 310 together with the tray 110 are transported in the rear compartment 104 where it is located tray storing means 500. When the second position of the jaw horizontal transportation means 364 is reached, the jaw 310 is slightly rotated downwardly and the tray 110 is released from the jaw 310 so the tray 110 fails to the support for collecting trays 510. Tray storing means 500 comprises said support for collecting trays 510 mounted to the lifting device 530 which lowers the vertical position of said support for collecting trays 510 each time new tray 110 is put on it (trays are collected one upon each other so long predetermined quantity is reached, the best results were achieved when approx. 80 trays were store, more trays means more load to the lifting device 530 which require more robust garbage disposal apparatus construction). The lifting device comprises lifting device linear guide 512, lifting device bearing 514, lifting device spindle 532 and lifting device motor with snail gear 534.

When the full capacity is reached, means for detecting the tray's quantity 550 detects that there is no more space for new tray 110 to be collected and appropriate message is shown on the display 600. To continue with the use, it is necessary to remove collected trays from the garbage disposal apparatus.

Garbage is disposed in the receptacle for garbage disposal 400, which is usually a bin, but could be also a plastic bag. On the suitable place within the garbage disposal apparatus 100 there is installed garbage level detection means 410, usually as two infrared level detectors, which monitors if the receptacle 400 is full with garbage, and if so, signals to the display 600 that there is a need to empty the receptacle 400, at which appropriate message is shown and garbage disposal apparatus stops working, due to the need to empty collected garbage.

To achieve appropriate level of economy, especially space use, in the front compartment 102, under the platform for receiving the tray 220, and above the receptacle 400, there is compressing means 420 with the function to press (compact) garbage in the receptacle 400 to decrease the volume of garbage. The garbage press 420 operates when the garbage level in the receptacle is 60% or more, what is the threshold value to activate said garbage press 420 (compressing means). When the garbage level reaches said threshold value, the compressing means 420 is activated and garbage in the receptacle is compacted by the plate 422 which plate does have a plate upper side 424 and a plate lower side 426. The plate 422 is pushed downward by the set of scissor type levers 430 run by a spindle 460 which is operated bidirectionally by a spindle electromotor 464. The spindle 460, attached to the apparatus 100 construction by spindle support 462, comprises the engagement means 450 which transfers the spindle rotation, depending on the rotation direction, in forward (scissor type levers close what means the plate 422 is lifted) or in backward (scissor type levers open what means the plate 422 is pressed down). Due to the resistance caused by the garbage compression, electromotor 464 takes extra current to keep pushing the plate 422. This current increase is detected and spindle electromotor 464 stops operation and changes the way of rotation, so the plate 422 is lifted upward.

In one embodiment compressing means 420 is realized with a plate 422 having upper 424 and lower side 426, said plate 422 being placed horizontally; further it comprises two sets of scissor type levers 430, each said set 430 having fulcrum 432 and two levers 434,436, the first lever 434 and the second lever 436, attached in fulcrum 432 in the middle of each lever 434,436 so the first lever 434 can rotate relative to the second lever 436, wherein each lever 434,436 has the first and the second end, the said first end being close to the plate 422; further it comprises two lower sliders 440, each attached to the first end of each first lever 434, and two linear guides with closed ends parallelly mounted on the upper side of the plate 442, two linear guides with closed ends parallelly mounted on the tray receiving means 444, two upper sliders 446, each attached to the second end of each second lever 436, spindle 460, spindle electromotor 464 and an engagement means 450, the plate 422 being attached to the two sets of scissor type levers 430, so the upper plate side 424 is oriented toward the first end of each lever. In this embodiment each lower slider 440 is installed on each linear guide mounted on the upper side of the plate 442, so said sliders 440 can slide over said linear guide 442 together with the lever's end between said linear guide's ends and wherein each upper slider 446 is installed on each linear guide mounted on the tray receiving means 444, so said upper slider 446 can slide over said linear guide 444 together with the lever's end between said linear guide's ends. The upper sliders 446 are moved by the engagement means 450, and when the engagement means 450 activated, the upper sliders 446 move parallel in direction determined by the rotation of the spindle 460 driven by spindle electromotor 464, so the plate 422 might move in vertical direction up or down, depending either if it is needed to press the garbage in the receptacle for garbage disposal 400 when it moves down, or moving up when the plate 422 goes back in his original position.

When the receptacle 400 is full and garbage compression is not possible any more, there is a message on the display 600 that to continue operations it is required to empty the receptacle 400. In one embodiment, the receptacle 400 once full, is automatically removed from the garbage disposal apparatus. Usually, the receptacle is placed within the cage 476 which holds the receptacle 400 securely when in garbage disposal apparatus, but also when electromotor for receptacle removal 472 runs the receptacle drive belt 474 which transfers rotation to the horizontal movement over the receptacle linear side guide 470 so the cage 476 slides, depending up to the direction in which said electromotor 472 rotates. When the cage 476 comes out of the garbage disposal apparatus 100, the full receptacle 400 is manually emptied or it is exchanged with the empty one.

To ensure the highest level of personal safety, especially of the person which put the tray 110 on the platform for receiving the tray 220, there are several sensors which detects if hands are in the range of movable apparatus 100 parts. The most important is the infrared sensor for hand detection 210 which covers the initial part of the platform 220, what is the place where are the hands of the person delivering the tray 110. This IR sensor 210 is constructed as NC (normal closed) what means that in the case that said IR sensor is broken, the apparatus 110 will not operate. The corresponding error message will be shown on the display 600.

The most critical part of the apparatus 100 operation is when the platform for receiving the tray 220 returns from the rear compartment 104 to the front compartment 102 into the position for receiving new tray 110. Nearby installed IR sensors for hand detection 210 there is an extra protection achieved by the platform drive belt 286 slipping when unexpected load is present. Additionally, inventor has developed complete garbage disposal system 800 comprising in the best embodiment at least one garbage disposal apparatus 100, at least one horizontal tunnel 810, at least one vertical tunnel 820 and at least one tray collecting means 830 arranged so each vertical tunnel 820 intersects perpendicularly each horizontal tunnel 810. There is an opening of the horizontal tunnel 812 suitable to move trays 110 from the garbage disposal apparatus to the tray collecting means 830, and there is an opening of the vertical tunnel 822 suitable to put through plastic sacks 842 into the vertical tunnel 820. When in operation and when the maximum level of garbage in garbage disposal apparatus 100 is reached or when the maximum number of trays 110 in tray storing means is reached 500, the garbage disposal apparatus 100 is placed over the opening of the vertical tunnel 822 so the front compartment 102 is above vertical tunnel 820 and the rear compartment 104 is above the horizontal tunnel 810. In this application the receptacle for garbage disposal 400 is a sack 842. At least one tray collecting means 830 travels horizontally within the horizontal tunnel 810 from one vertical tunnel 820 to the place for emptying said tray collecting means 830. When the sack 842 is full with garbage, said sack 842 is eliminated from apparatus 100 through the vertical tunnel and/or if tray storing means 500 is full with trays 110, said trays 110 are picked up by tray collecting means 830 and are transported to the spot for emptying.

Figure 17:
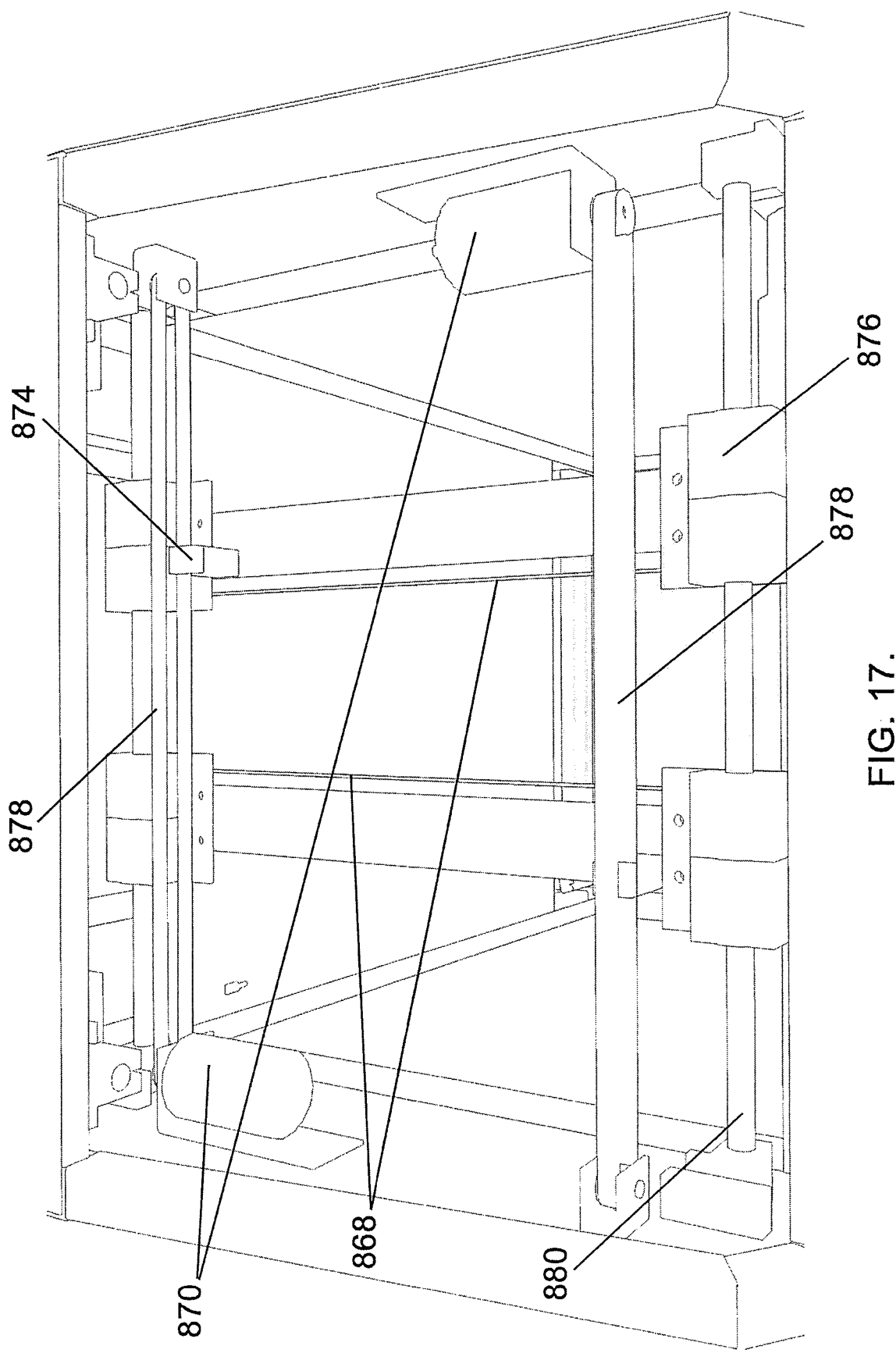
Figure 18:
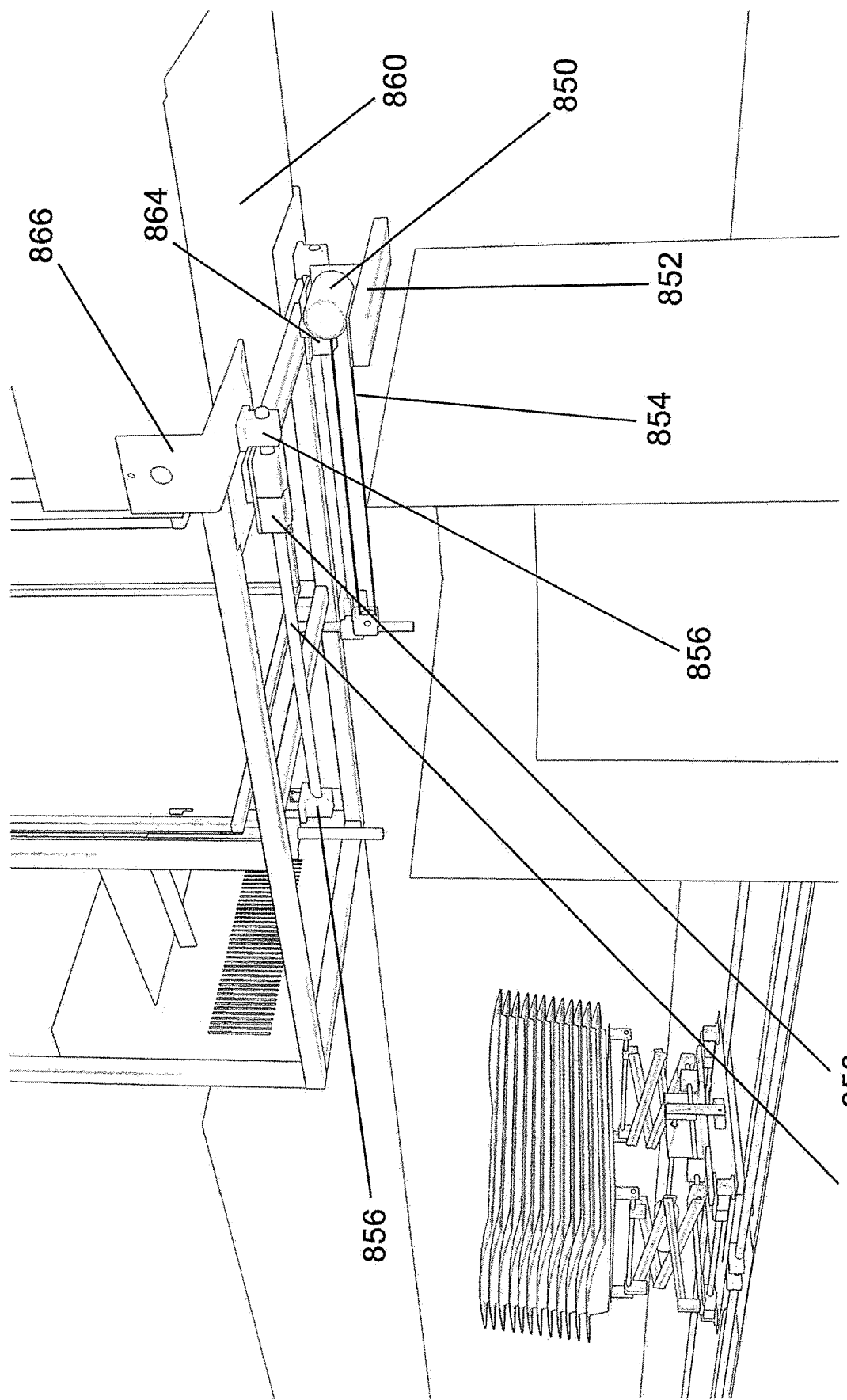

In usual application the tray collecting means 830 is an electromotor operated scissor lift platform 832. Also, in one further embodiment, this system further comprises a container 840 placed under the vertical tunnel 820, so each sack 842 from garbage disposal apparatus 100 fails into said container 840 due to the gravity. As it is shown in details in FIG. 17. And FIG. 18. in one further embodiment, there is a device for sealing the sack 842 and for disposing the sack 842 full with garbage from the garbage disposal apparatus 100. The mechanism for disposing the sack 842 comprises lower motor 850, lower motor support 852, lower belt 854, lower liner guides 862 on which slides lower linear bearings 858. Lower linear guides 862 are fitted to the construction of the garbage disposal apparatus 100 by lower axial supports 856 attached to the lower axial support base 866. Said motor 850 is responsible for the movement of platform shaped doors 860. Movement transmission between lower belt 854 and linear guide 858 is done through lower belt and lower linear guide engagement means 864. Before disposal, the plastic sack 842 is closed by welding with hot bar sealer 868. Then platform shaped door 860 opens and due to the gravity, the sack 842 fails through the vertical channel 820 into the container 840. The platform shaped door 860 comes in its initial position and the garbage disposal apparatus 100 is ready for further operations. By sack welding it is assured that the vertical channel 820 stays clean after sack 842 travels through the vertical channel 820.

When garbage level detection means 410 detects that there is no more empty space in the sack, the sack opening is welded with hot bar sealer 868. The device for sealing the sack comprises said hot bar sealer 868, two sealer motors 870, sealer linear guides 880, sealers belts 878, sealer engagement means 874 and sealer linear bearings 876.

Two sealers motor 870 move sealer belts 878 which by the use of the sealer engagement means 874 move sealer linear bearings 876 sliding on the seal linear guides 880. Hot bar sealer 868 is attached to the sealer linear bearings 876, so, depending on the controlled motor rotation direction, the hot bar sealer 868 closes or opens. When closed, the sack is welded.

Trays are normally collected in tray storing means 500, precisely on support for collecting trays 510. When it is detected that the maximum number of trays is on the support for collecting trays 510, said support moves aside and trays slips to the scissor lift platform 832. The detector placed on the scissor lift platform 832 detects that on said platform there are trays, so automatically said platform starts to lower down together with trays.

In the same moment the support for collecting trays 510 returns back to its position in the rear compartment 104 and the garbage disposal apparatus 100 is ready to use. Parallel in the horizontal tunnel 810 sensor detects that the scissor from the scissor lift platform 832 are down and that said scissor lift platform 832 were transported together with trays 110 through the horizontal tunnel. When scissor lift platform 832 reaches its final position within the horizontal tunnel there is a sensor detecting that scissor lift platform 832 has reached its final position so the motor which runs the scissor lift platform 832 is turned off. In this final position scissor lift platform 832 lifts trays 110 to the height predetermined with sensor. When said height is reached, the scissor lift platform 832 stops and operator can remove trays 110 from the scissor lift platform 832. So long trays are not removed, the scissor lift platform 832 stays in this location. When last tray removed (scissor lift platform is empty), sensor detects that there is no tray and scissor lift platform 832 goes down. Once detected that scissor lift platform 832 is in closed position, the scissor lift platform 832 starts to travel toward the garbage disposal apparatus 100, eventually to the one full with trays. The cycle repeats.

The reliability of this system and the garbage disposal apparatus is very high due to the simple automation and sensors used. Each linear movement is secured with switch off devices in the case end position reached, also there are sensors to detect vertical position of scissor lift or horizontal position of scissor lift platform.

All detectors are connected to PLC which monitors and controls the functioning of the garbage disposal apparatus 100.

PLC controls electromotors and whole series of optical sensors and microswitches 212. On the display connected to the PLC there is a separate menu with maintenance mode in which mode it is possible to check the functionality of each machine part. The best solution is to use display 600 with touch screen which at least present messages, the tray storage status and level to which the receptacle for the garbage disposal if filled. The communication between display and PLC is industrial MODBUS communication which secures max. reliability. The control unit with power supply 610 is located in the rear compartment 104.

The invention claimed is:

1. Garbage disposal apparatus for receiving a tray comprising:
   a tray receiving means including a platform structurally configured to receive the tray, the platform defining a proximal end and a distal end opposite the proximal end, and including at least one wheel thereon engageable with the with the tray so as to direct the tray toward the distal end of the platform;
   a tray manipulating means including a jaw positionable at the distal end of the platform, the jaw structurally configured to grasp a portion of the tray positioned on the platform in releasable engagement, with one of the jaw and the platform being movable relative to each other so as to separate the at least one tray from the platform, and the jaw being shakable so as to be able to shake the tray;
   a receptacle for garbage disposal being positionable below at least the proximal end of the at least one tray such that upon shaking, garbage on the tray is urged to slip off the proximal end and into the receptable; and
   and a tray storing means, including a support structurally configured to receive a tray, with at least one of the jaw and the support being movable such that upon release of the at least one tray, the tray is directed to the support of the tray storing means,
      wherein the tray receiving means is structurally configured to receive the tray and directs the tray to the tray manipulating means which removes garbage from the tray into the receptacle for garbage disposal and whereupon the tray can be released onto the support of the tray storing means.

2. Garbage disposal apparatus in accordance with claim 1, characterized in that the tray receiving means further comprises:
   at least two infrared sensors positioned proximate the platform so as to detect at least one of a presence or absence of a hand of a user.

3. Garbage disposal apparatus in accordance with claim 2, further comprising a tray adjustment means, wherein the tray adjustment means comprises:
   a tray directing means having two sheets fixed on opposing sides of the platform, narrowing an effective size of the platform in the direction of the jaws; and
   a tray detecting means comprising at least one infrared sensor and microswitch.

4. Garbage disposal apparatus in accordance with claim 1, characterized in that the jaw is movable in a horizontal direction between a first position and a second position, or holds one of these positions, and wherein the jaw is positioned proximate the distal end of the platform in the first position, and spaced apart therefrom in the second position, whereupon grasping by the jaws of the tray the platform is movable away from the tray so as to reveal the receptacle for garbage disposal, and whereupon positioning of the tray onto the support when the jaw is in the second position.

5. Garbage disposal apparatus in accordance with claim 1, characterized in that the tray storing means further comprises:
   a lifting device, with the support coupled to the lifting device to allow for translation of the support therealong;
   and a sensor positioned proximate the lifting device, wherein the sensor is triggered when the support has reached a maximum trays permissible.

6. Garbage disposal apparatus in accordance with claim 1, further comprising:
   a garbage level detection means being at least one infrared level detector;
   a compressing means comprising a plate movable within the receptacle for garbage disposal toward a lower end thereof, to, in turn compress garbage positionable between the plate and the lower end of the receptacle for garbage disposal;

and a receptacle removal means structurally configured to slide the receptacle for garbage disposal away from the platform and the jaw for removal thereof.

7. Garbage disposal apparatus in accordance with claim 6, characterized in that compressing means comprises:
the plate having upper and lower side, wherein the plate is placed horizontally;
two sets of scissor type levers each said set of scissor type levers having a fulcrum a first lever and a second lever, attached to the fulcrum in a middle of each of the first and second levers so the first lever is rotatable relative to the second lever, wherein each lever has first and the second end, the first end of each of the first and second levers being proximate the plate;
a pair of lower sliders, each lower slider attached to the first end of each first lever;
a pair of linear guides with each linear guide having a closed ends parallelly mounted on the upper side of the plate;
a second pair linear guides with each second pair of linear guides having a closed ends parallelly mounted on the tray receiving means;
a pair of upper sliders, each attached to the second end of each second lever;
a spindle rotatably coupled to the tray receiving means;
a spindle electromotor engageable with the spindle whereupon energized, the spindle electromotor rotates the spindle;
and an engagement means coupled to the upper sliders and rotatably positionable relative to the spindle, whereupon rotation of the spindle translates the engagement means to move the upper sliders
wherein the plate is attached to the two sets of scissor type levers so the upper plate side is oriented toward the first end of each lever;
wherein each lower slider is installed on each linear guide mounted on the upper side of the plate.

8. Garbage disposal apparatus in accordance with claim 1, further comprising:
a control unit with a power supply
and a display electrically coupled to the control unit, wherein the control unit comprises a PLC.

9. Garbage disposal apparatus in accordance with claim 1, further comprising:
a front compartment and a rear compartment
wherein the receptacle for garbage disposal is located in the front compartment and the tray storing means is located in the rear compartment-.

10. A garbage disposal system further comprising at least one garbage disposal apparatus as claimed in claim 9, at least one horizontal tunnel and/or at least one vertical tunnel, wherein horizontal tunnel is structurally configured for tray transportation and a delivery of trays to the horizontal tunnel and the delivery of garbage to the vertical tunnel.

11. A garbage disposal system according claim 10, further comprising at least one horizontal tunnel and at least one tray collecting means, wherein when the maximum number of trays in tray storing means is reached, the garbage disposal apparatus is placed over the opening of the horizontal tunnel so the rear compartment is above the opening of the horizontal tunnel, and wherein at least one tray collecting means is configured to travel horizontally within the horizontal tunnel from the horizontal tunnel opening to a place for emptying said tray collecting means, and when tray storing means has reached a maximum capacity, the tray collecting means is structurally configured to transport trays to a place for emptying said tray collecting means.

12. A garbage disposal system according to claim 11, characterised in that tray collecting means comprises an electromotor operated scissor lift platform.

13. A garbage disposal system according to claim 10, further comprising at least one vertical tunnel, and wherein each garbage disposal apparatus, when in operation and when a maximum level of garbage in apparatus is reached, the apparatus is structurally configured to be positionable over the opening of the vertical tunnel so the front compartment is above the opening of the vertical tunnel and wherein the receptacle for garbage disposal comprises a sack and wherein, if the sack is full with garbage, the sack is firstly closed within apparatus and then eliminated from apparatus through the vertical tunnel.

14. A garbage disposal system according to the claim 13, further comprising a container positionable under the vertical tunnel, so the sack disposed from the garbage disposal apparatus is directed into said container.

\* \* \* \* \*